(12) United States Patent
Luo et al.

(10) Patent No.: US 11,943,176 B2
(45) Date of Patent: Mar. 26, 2024

(54) TIME DIVISION DUPLEXING PATTERN DETECTION FOR REPEATERS

(71) Applicant: QUALCOMM Incorporated, San Diego, CA (US)

(72) Inventors: Jianghong Luo, Skillman, NJ (US); Navid Abedini, Basking Ridge, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 227 days.

(21) Appl. No.: 17/348,528

(22) Filed: Jun. 15, 2021

(65) Prior Publication Data

US 2022/0399984 A1 Dec. 15, 2022

(51) Int. Cl.
*H04L 5/14* (2006.01)
*H04L 5/00* (2006.01)
*H04W 16/26* (2009.01)

(52) U.S. Cl.
CPC .............. *H04L 5/14* (2013.01); *H04L 5/0048* (2013.01); *H04W 16/26* (2013.01)

(58) Field of Classification Search
CPC ........ H04L 5/14; H04L 5/0048; H04W 16/26; H04B 7/15528
See application file for complete search history.

(56) References Cited

U.S. PATENT DOCUMENTS

| 11,457,510 B2 * | 9/2022 | Chatterjee | H04L 5/0092 |
| 2009/0325578 A1 * | 12/2009 | Li | H04W 36/0009 455/436 |

(Continued)

FOREIGN PATENT DOCUMENTS

| EP | 3001579 A1 | 3/2016 | |
| WO | WO-2020016934 A1 * | 1/2020 | ........... H04L 5/1469 |

OTHER PUBLICATIONS

CATT: "Discussion on TDD Repeater Related Requirements", 3GPP TSG-RAN WG4 Meeting # 98-bis-e, R4-2104794, 3rd Generation Partnership Project, Mobile Competence Centre, 650 Route Des Lucioles, F-06921, Sophia-Antipolis Cedex, France, vol. RAN WG4, No. Electronic Meeting, Apr. 12, 2021-Apr. 20, 2021, Apr. 2, 2021, 2 Pages, XP052175812.

(Continued)

*Primary Examiner* — Ian N Moore
*Assistant Examiner* — Sun Jong Kim
(74) *Attorney, Agent, or Firm* — Holland & Hart LLP

(57) ABSTRACT

Methods, systems, and devices for wireless communications are described. A repeater extends coverage of wireless communications services between two wireless nodes (a base station and a user equipment (UE)). A network control node (e.g., a base station) receives a first indication of a capability of a repeater to detect a time division duplexing (TDD) pattern of a channel between the base station and the UE. The base station transmits, to the UE and via the repeater, one or more parameters associated with the UE performing one or more channel measurements and reference signals for the channel measurements. The base station transmits, to the repeater, a second indication of a TDD pattern of the channel based on the capability of the repeater. Based on the indication of the TDD pattern, the repeater adjusts one or more radio frequency components of the repeater.

28 Claims, 18 Drawing Sheets

(56) References Cited

U.S. PATENT DOCUMENTS

| | | | |
|---|---|---|---|
| 2015/0358914 A1* | 12/2015 | Song | H04W 74/006 370/280 |
| 2016/0156455 A1* | 6/2016 | Park | H04W 72/0446 370/280 |
| 2016/0183308 A1* | 6/2016 | Eriksson | H04W 72/0446 370/329 |
| 2016/0295494 A1* | 10/2016 | Gulati | H04W 72/542 |
| 2019/0238257 A1* | 8/2019 | Hosseini | H04L 1/0004 |
| 2020/0052775 A1* | 2/2020 | Nam | H04B 17/336 |
| 2021/0307016 A1* | 9/2021 | Takeda | H04W 72/0446 |
| 2022/0174672 A1* | 6/2022 | Ko | H04L 5/14 |

OTHER PUBLICATIONS

CMCC: "Discussion on RF Architecture and RF Requirements Scope of Repeater", 3GPP TSG-RAN WG4 Meeting # 98-e, R4-2100827, 3rd Generation Partnership Project, Mobile Competence Centre, 650 Route Des Lucioles, F-06921 Sophia-Antipolis Cedex, France, vol. RAN WG4, No. Electronic Meeting, Jan. 25, 2021-Feb. 5, 2021, Jan. 15, 2021, 3 Pages, XP051972027.
International Search Report and Written Opinion—PCT/US2022/029860—ISA/EPO—dated Aug. 23, 2022.

* cited by examiner

TIME DIVISION DUPLEXING PATTERN DETECTION FOR REPEATERS

FIELD OF TECHNOLOGY

The following relates to wireless communications, including time division duplexing pattern detection for repeaters.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). Some wireless communication systems may use signal repeating devices (e.g., repeaters) to extend coverage of wireless communications services. Techniques for indicating a capability of the repeater may be deficient.

SUMMARY

The described techniques relate to improved methods, systems, devices, and apparatuses that support time division duplexing (TDD) pattern detection for repeaters. Generally, the described techniques provide for a repeater (e.g., a network-controlled repeater) to use TDD pattern detection in wireless communications. A network control node (e.g., a base station) may receive an indication of the capability of the repeater to detect a TDD pattern of a channel between two network nodes (e.g., the base station and a user equipment (UE)). In some cases, the base station may also receive an indication of a configuration of the repeater. Based on the capability of the repeater, the base station may transmit an indication to the repeater including the TDD pattern of the channel, and the base station may transmit control signaling to the UE, via the repeater, based on the capability and the configuration of the repeater. For example, the base station may transmit parameters and reference signals associated with the UE performing channel measurements. The repeater may determine whether the information transmitted between the base station and the UE includes downlink information, uplink information, or both, and may adjust radio frequency components it may use accordingly (e.g., the repeater may adjust parameters of the radio frequency components of the repeater based on the TDD pattern of the channel).

A method for wireless communication at a network control node is described. The method may include receiving a first indication of a capability of a repeater to detect a TDD duplexing pattern of a channel that communicates information between two nodes using the repeater, transmitting, to a UE and via the repeater, one or more parameters associated with the UE performing one or more channel measurements based on the capability of the repeater to detect the TDD pattern, and transmitting, to the UE via the repeater, reference signals for the one or more channel measurements based on transmitting the one or more parameters.

An apparatus for wireless communication at a network control node is described. The apparatus may include a processor, memory coupled with the processor, and instructions stored in the memory. The instructions may be executable by the processor to cause the apparatus to receive a first indication of a capability of a repeater to detect a TDD pattern of a channel that communicates information between two nodes using the repeater, transmit, to a UE and via the repeater, one or more parameters associated with the UE performing one or more channel measurements based on the capability of the repeater to detect the TDD pattern, and transmit, to the UE via the repeater, reference signals for the one or more channel measurements based on transmitting the one or more parameters.

Another apparatus for wireless communication at a network control node is described. The apparatus may include means for receiving a first indication of a capability of a repeater to detect a TDD pattern of a channel that communicates information between two nodes using the repeater, means for transmitting, to a UE and via the repeater, one or more parameters associated with the UE performing one or more channel measurements based on the capability of the repeater to detect the TDD pattern, and means for transmitting, to the UE via the repeater, reference signals for the one or more channel measurements based on transmitting the one or more parameters.

A non-transitory computer-readable medium storing code for wireless communication at a network control node is described. The code may include instructions executable by a processor to receive a first indication of a capability of a repeater to detect a TDD pattern of a channel that communicates information between two nodes using the repeater, transmit, to a UE and via the repeater, one or more parameters associated with the UE performing one or more channel measurements based on the capability of the repeater to detect the TDD pattern, and transmit, to the UE via the repeater, reference signals for the one or more channel measurements based on transmitting the one or more parameters.

Some examples of the method, apparatuses, and non-transitory computer-readable medium described herein may further include operations, features, means, or instructions for scheduling communication resources for communication with the UE via the repeater based on the capability of the repeater to detect the TDD pattern of the channel based on receiving the first indication and transmitting, to the UE via the repeater, a message that schedules the communication resources.

Some examples of the method, apparatuses, and non-transitory computer-readable medium described herein may further include operations, features, means, or instructions for receiving a second indication of a configuration of the repeater, where transmitting the one or more parameters may be based on the configuration of the repeater, where the one or more parameters associated with the UE performing the one or more channel measurements may be based on the configuration of the repeater and the capability of the repeater.

Some examples of the method, apparatuses, and non-transitory computer-readable medium described herein may further include operations, features, means, or instructions for transmitting a second indication of the TDD pattern of the channel, where transmitting the one or more parameters may be based on transmitting the second indication.

In some examples of the method, apparatuses, and non-transitory computer-readable medium described herein, the second indication includes an information element communicated in a system information block (SIB), the information element including a common TDD configuration associated with a cell of a wireless network.

In some examples of the method, apparatuses, and non-transitory computer-readable medium described herein, the second indication includes an information element communicated in a radio resource control (RRC) reconfiguration message, the information element including a dedicated TDD configuration that may be specific to the UE.

In some examples of the method, apparatuses, and non-transitory computer-readable medium described herein, the second indication includes a slot format indicator (SFI) communicated in downlink control information (DCI), a specific slot format in the SFI associated with the UE in a serving cell.

In some examples of the method, apparatuses, and non-transitory computer-readable medium described herein, transmitting the one or more parameters associated with the UE performing the one or more channel measurements may include operations, features, means, or instructions for transmitting, based on the second indication, a third indication to perform a first set of channel measurements on a first set of resources indicated by the TDD pattern as uplink or downlink and a fourth indication to perform a second set of channel measurements on a second set of resources indicated by the TDD pattern as flexibly configurable as either uplink or downlink.

Some examples of the method, apparatuses, and non-transitory computer-readable medium described herein may further include operations, features, means, or instructions for receiving, from the repeater, a feedback message indicating one or more conditions associated with the repeater and transmitting, to the UE and via the repeater, the one or more parameters associated with the UE performing the one or more channel measurements based on receiving the feedback message.

In some examples of the method, apparatuses, and non-transitory computer-readable medium described herein, the one or more parameters includes a power control parameter, a resource configuration, or a combination thereof.

In some examples of the method, apparatuses, and non-transitory computer-readable medium described herein, the first indication includes a first capability that the repeater may be capable of decoding system block information, a second capability that the repeater may be capable of decoding an RRC reconfiguration message, a third capability that the repeater may be capable of decoding DCI, a fourth capability that the repeater may be capable of detecting whether a communication resource may be used to communicate uplink information or downlink information, or a combination thereof.

In some examples of the method, apparatuses, and non-transitory computer-readable medium described herein, the repeater may be a traditional repeater configured to receive and amplify signals independent of control information about the TDD pattern of the channel, an autonomous repeater configured to identify information about the TDD pattern of the channel based on channel conditions at the repeater, or a network-controlled repeater configured to receive the control information about the TDD pattern of the channel.

Some examples of the method, apparatuses, and non-transitory computer-readable medium described herein may further include operations, features, means, or instructions for transmitting a second indication of communication parameters for communications between the UE and the network control node based on the capability of the repeater, the communication parameters including a modulation and coding scheme (MCS), a rank, a quantity of beams, or a combination thereof.

Some examples of the method, apparatuses, and non-transitory computer-readable medium described herein may further include operations, features, means, or instructions for transmitting, to the repeater, a power configuration associated with the channel, TDD pattern associated with the channel, or a combination thereof based on the capability of the repeater.

In some examples of the method, apparatuses, and non-transitory computer-readable medium described herein, the network control node includes a base station, a UE, or a combination thereof.

A method for wireless communication at a repeater is described. The method may include transmitting, to a network control node, a first indication of a capability of the repeater to detect a TDD pattern of a channel that communicates information between two nodes using the repeater, receiving a second indication of the TDD pattern of the channel based on transmitting the capability of the repeater, and adjusting one or more radio frequency components of the repeater based on the second indication of the TDD pattern.

An apparatus for wireless communication at a repeater is described. The apparatus may include a processor, memory coupled with the processor, and instructions stored in the memory. The instructions may be executable by the processor to cause the apparatus to transmit, to a network control node, a first indication of a capability of the repeater to detect a TDD pattern of a channel that communicates information between two nodes using the repeater, receive a second indication of the TDD pattern of the channel based on transmitting the capability of the repeater, and adjust one or more radio frequency components of the repeater based on the second indication of the TDD pattern.

Another apparatus for wireless communication at a repeater is described. The apparatus may include means for transmitting, to a network control node, a first indication of a capability of the repeater to detect a TDD pattern of a channel that communicates information between two nodes using the repeater, means for receiving a second indication of the TDD pattern of the channel based on transmitting the capability of the repeater, and means for adjusting one or more radio frequency components of the repeater based on the second indication of the TDD pattern.

A non-transitory computer-readable medium storing code for wireless communication at a repeater is described. The code may include instructions executable by a processor to transmit, to a network control node, a first indication of a capability of the repeater to detect a TDD pattern of a channel that communicates information between two nodes using the repeater, receive a second indication of the TDD pattern of the channel based on transmitting the capability of the repeater, and adjust one or more radio frequency components of the repeater based on the second indication of the TDD pattern.

Some examples of the method, apparatuses, and non-transitory computer-readable medium described herein may further include operations, features, means, or instructions for detecting one or more conditions of information communicated between the two nodes via the repeater and determining whether the information includes downlink information or uplink information based on detecting the one or more conditions, where adjusting the one or more radio frequency components may be based on the determination.

Some examples of the method, apparatuses, and non-transitory computer-readable medium described herein may further include operations, features, means, or instructions for receiving, from the network control node, a message that schedules communication resources for communication between the network control node and a UE based on the capability of the repeater and retransmitting the message that schedules the communication resources to the UE based on receiving the message.

In some examples of the method, apparatuses, and non-transitory computer-readable medium described herein, the second indication includes an information element communicated in an SIB, the information element including a common TDD configuration associated with a cell of a wireless network.

In some examples of the method, apparatuses, and non-transitory computer-readable medium described herein, the second indication includes an information element communicated in an RRC reconfiguration message, the information element including a dedicated TDD configuration that may be specific to the UE.

In some examples of the method, apparatuses, and non-transitory computer-readable medium described herein, the second indication includes an SFI communicated in DCI, a specific slot format in the SFI associated with the UE in a serving cell.

Some examples of the method, apparatuses, and non-transitory computer-readable medium described herein may further include operations, features, means, or instructions for transmitting a third indication of a configuration of the repeater, where receiving the second indication may be based on the configuration of the repeater.

In some examples of the method, apparatuses, and non-transitory computer-readable medium described herein, the first indication includes a first capability that the repeater may be capable of decoding system block information, a second capability that the repeater may be capable of decoding an RRC reconfiguration message, a third capability that the repeater may be capable of decoding DCI, a fourth capability that the repeater may be capable of detecting whether a communication resource may be used to communicate uplink information or downlink information, or a combination thereof.

In some examples of the method, apparatuses, and non-transitory computer-readable medium described herein, the repeater includes a network-controlled repeater configured to receive control information about the TDD pattern of the channel.

Some examples of the method, apparatuses, and non-transitory computer-readable medium described herein may further include operations, features, means, or instructions for receiving a third indication of communication parameters for communications between the UE and the network control node based on the capability of the repeater, the communication parameters including an MCS, a rank, a quantity of beams, or a combination thereof.

Some examples of the method, apparatuses, and non-transitory computer-readable medium described herein may further include operations, features, means, or instructions for receiving, from the network control node, a power configuration associated with the channel, the TDD pattern associated with the channel, or a combination thereof based on the capability of the repeater to detect the time division duplexing pattern.

DETAILED DESCRIPTION

Figure 1:
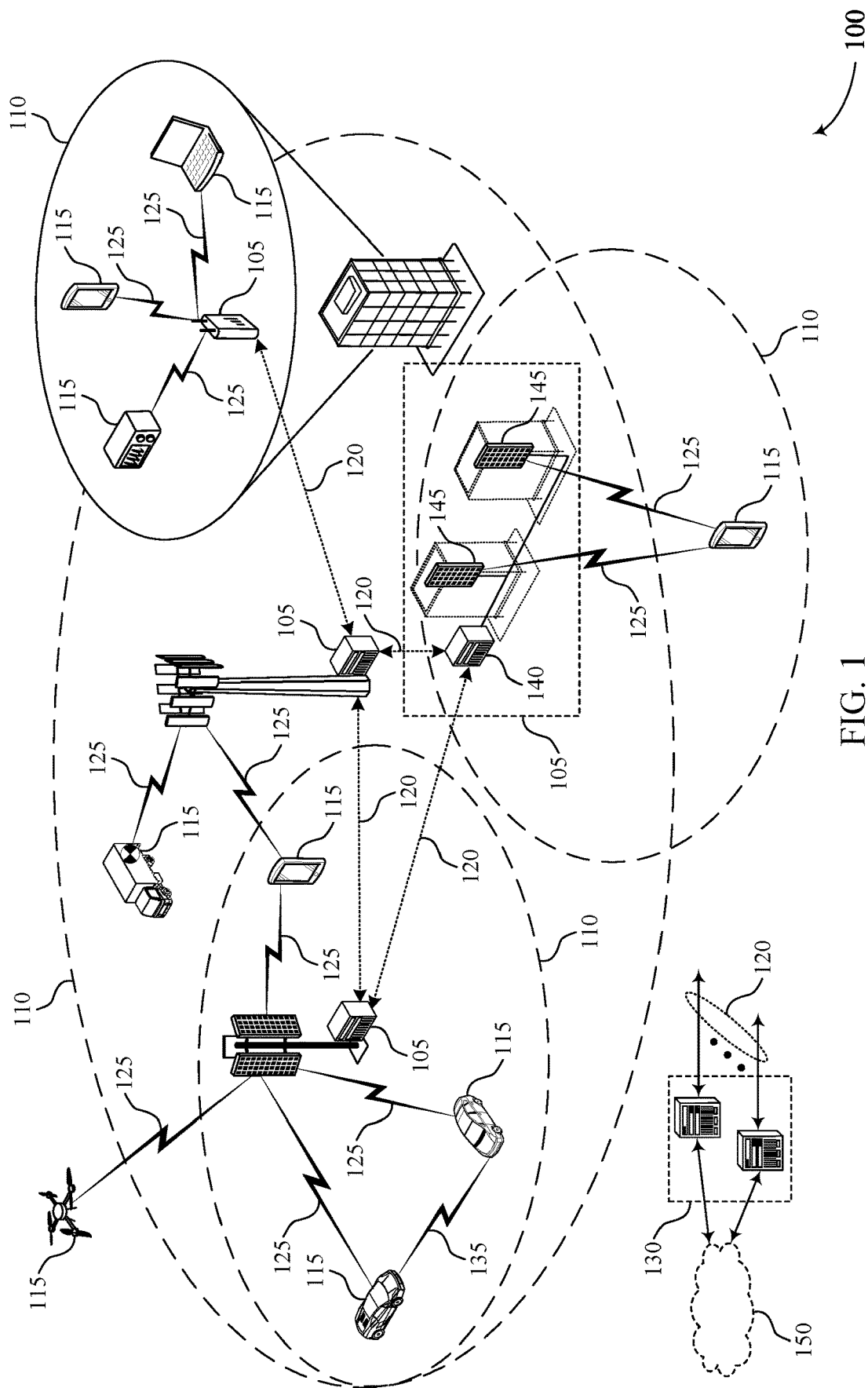
FIG. 1 illustrates an example of a wireless communications system that supports time division duplexing (TDD) pattern detection for repeaters in accordance with aspects of the present disclosure.

Some wireless communication systems, such as fifth generation (5G) New Radio (NR) systems, may support using signal repeating devices (e.g., repeaters, relay nodes) to extend coverage of wireless communications services. The terms repeating device and repeater may be used interchangeably. For example, a base station may transmit or receive signaling via a repeater, which may enable the base station to share information with a user equipment (UE) operating outside of a coverage area for the base station or avoid sources of interference. In some implementations, the repeater may be an example of a repeater that detects or receives signals, amplifies the signals, and retransmits the amplified signals without control signaling from the base station. In some implementations, the base station may transmit control signaling to a repeater indicating various aspects that may be relevant for forwarding messages. In some cases, delays or timing offsets between transmitting control signaling and transmitting messages may be based on a type of the repeater. A repeater may be limited by a maximum amplification gain (e.g., Gmax) that may be applied to signals received by the repeater, where the value of the maximum amplification gain may depend on the time division duplex (TDD) pattern of downlink information and uplink information of a time resource.

A wireless communications system may use TDD over a channel to communicate both downlink information and uplink information between two wireless nodes (e.g., a UE and a base station). In some cases, a repeater may have information of whether downlink information or uplink information is being communicated (e.g., the repeater may know the TDD pattern of the channel), and may thus improve the performance of the repeater based on the information. For example, if the repeater is continuously scanning to receive both downlink information and uplink information, the repeater may limit the maximum amplification gain that may be applied to retransmitted (e.g., forwarded) signals (e.g., by using unnecessary resources and increasing the chance of coupling between the signal transmitted by the repeater and the signal received by the repeater). In contrast, if the repeater has knowledge of a TDD pattern of the channel, the repeater may apply a higher amplification gain to the retransmitted signals. In some cases, the repeater may be informed of the TDD pattern (e.g., downlink or uplink) for a first subset of time resources, but may lack information of the TDD pattern for a second subset of time resources (e.g., time resources that may be configurable between uplink and downlink). As such, the repeater may operate differently when using the first subset of time resources than when using the second subset of time resources, which may introduce different end-to-end channel states (e.g., signal-to-noise ratio (SNR) values) between the two subsets of time resources. If the value of the amplification gain decreases, the overall quality of communications between wireless nodes may be reduced.

Techniques described herein enable a repeater (e.g., a network-controlled repeater) to use TDD pattern detection in wireless communications. In some examples, a repeater may detect a TDD pattern using signaling from the base station. In some examples, a repeater may detect a TDD pattern by detecting channel conditions of the signals being received by the repeater. In some cases, a network control node (e.g., a base station) may receive an indication of the capability of the repeater to detect a TDD pattern of a channel between two network nodes (e.g., the base station and a UE). In some cases, the base station may also receive an indication of a configuration of the repeater. Based on the capability of the repeater, the base station may transmit an indication to the repeater including the TDD pattern of the channel, and the base station may transmit control signaling to the UE, via the repeater, based on the capability and the configuration of the repeater. For example, the base station may transmit parameters and reference signals associated with the UE performing channel measurements that may be based on the configuration of the repeater, or the capability of the repeater, or both. The repeater may determine whether the information transmitted between the base station and the UE includes downlink information, uplink information, or both, and the repeater may adjust its radio frequency components accordingly.

The base station may configure different sets of channel measurements for a UE, via the repeater, based on the capability of the repeater and the configuration of the repeater. In some examples, the base station may transmit an indication of a TDD pattern of the channel to the repeater, and may transmit one or more parameters to the UE via the repeater for the UE to use when performing channel measurements. In some cases, the base station may transmit reference signals to the UE via the repeater for the channel measurements based on transmitting the parameters. In some examples, depending on the type of repeater, the indicator of the TDD pattern of the channel may include an indication of a common TDD configuration associated with a cell, a dedicated TDD configuration specific to the UE, or a slot format indicator (SFI).

Particular aspects of the subject matter described herein may be implemented to realize one or more advantages. The described techniques may support improvements in TDD pattern detection for repeaters by increasing coverage and reducing signaling overhead. Further, in some examples, the repeater capability to detect TDD patterns as described herein may support a higher amplification gain at the repeater, which may improve the overall quality of communications between wireless nodes, thereby improving latency and reliability for an improved user experience. As such, supported techniques may include improved network operations, and, in some examples, may promote network efficiencies, among other benefits.

Aspects of the disclosure are initially described in the context of wireless communications systems. Aspects of the disclosure are then described in the context of process flows. Aspects of the disclosure are further illustrated by and described with reference to apparatus diagrams, system diagrams, and flowcharts that relate to TDD pattern detection for repeaters.

FIG. 1 illustrates an example of a wireless communications system 100 that supports TDD pattern detection for repeaters in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and TDD component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots.

Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest SNR, or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Some wireless communication systems 100, such as 5G NR systems, may support using signal repeating devices (e.g., repeaters) to extend coverage of wireless communications services. For example, a base station 105 may transmit or receive signaling via a repeater, which may enable the base station 105 to share information with a UE 115 operating outside of a coverage area supported by the base station 105 or may enable a signal strength of a channel to improve by avoiding sources of interference. The repeater (e.g., a relay node) may use an amplify-and-forward operation between two wireless nodes (e.g., the base station 105 and the UE 115), which may be a simple and cost-effective way to improve network coverage in the wireless communications system 100. In some cases, the relay node may be a decode-and-forward relay node such as an IAB node.

The performance of a repeater may be improved with the addition of side information, which may include timing information (e.g., a slot, symbol, subframe, or frame boundary), a TDD pattern of the channel (e.g., whether a resource is a downlink resource, an uplink resource, or a flexible resource), ON-OFF scheduling, spatial information for beam management, or a combination thereof. In some cases, the wireless communications system 100 may include various types of repeaters. For example, a traditional repeater may be used without side information for amplify-and-forward operations. An autonomous smart repeater may, by itself, acquire or infer at least part of information (e.g., the side information) about the channel it may use. The autonomous smart repeater may acquire the information by receiving and decoding broadcast channels. A network-controlled repeater may be configured (e.g., controlled) with side information by a network node (e.g., the base station 105) via an established control interface. In some cases, for a network-controlled repeater, the side information may be provided (e.g., controlled) by the base station 105. In some cases, part of the side information may be configured (e.g., controlled) by the base station, while the remaining side information may be acquired or inferred by the network-controlled repeater, which may reduce control overhead, latency, or both.

Figure 2:
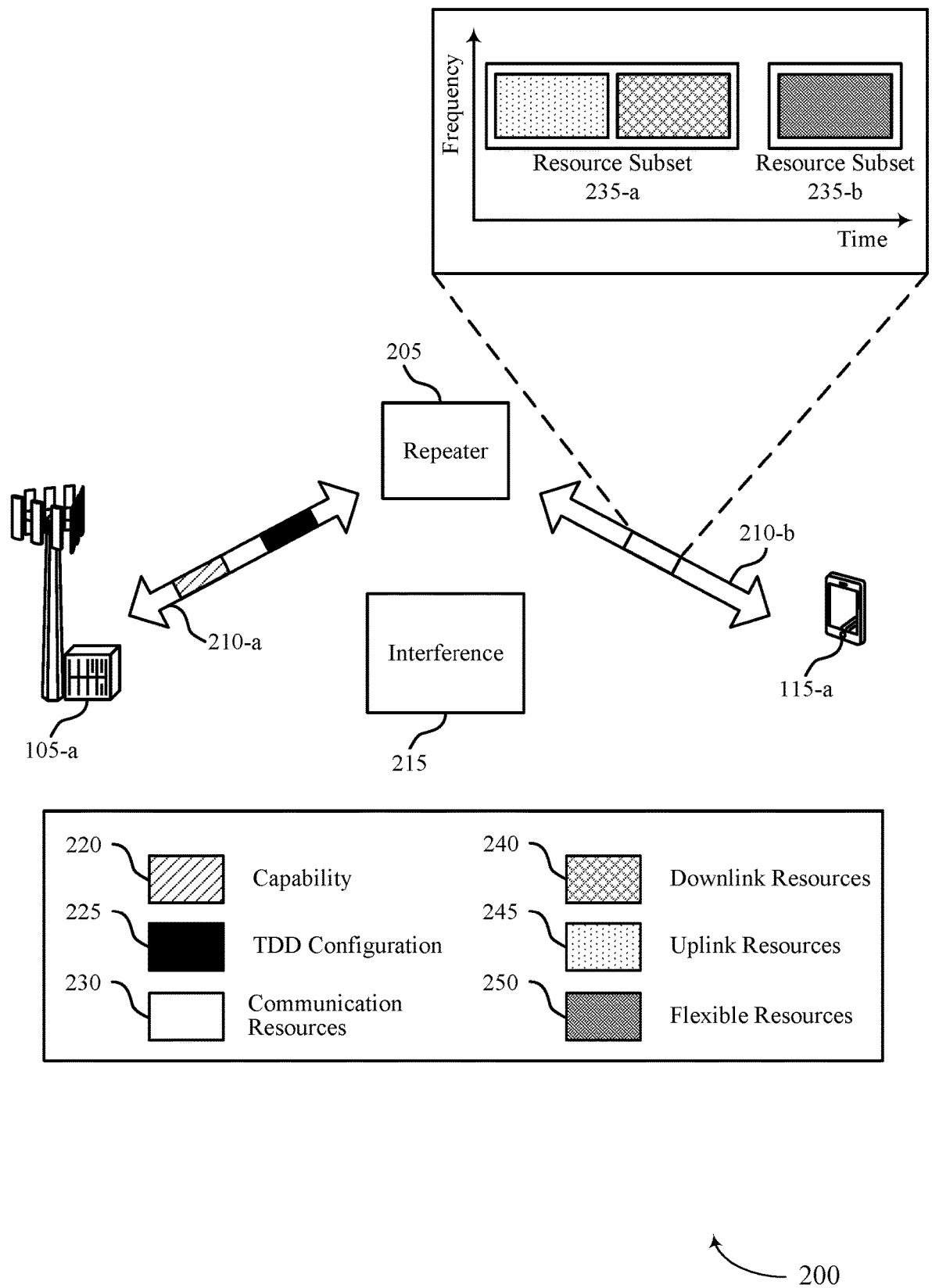
FIG. 2 illustrates an example of a wireless communications system that supports TDD pattern detection for repeaters in accordance with aspects of the present disclosure.

FIG. 2 illustrates an example of a wireless communications system 200 that supports TDD pattern detection for repeaters in accordance with aspects of the present disclosure. In some examples, the wireless communications system 200 may implement aspects of the wireless communications system 100 or may be implemented by aspects of the wireless communications system 100. For example, the wireless communications system 200 may include a UE 115-a and a base station 105-a, which may be examples of corresponding devices described herein with reference to FIG. 1. The wireless communications system 200 may include features for improved communications between the UEs 115, among other benefits.

In some cases, a repeater 205 may be used in the wireless communications system 200 to extend coverage and enable communications between a first wireless node and a second wireless node (e.g., the base station 105-a and the UE 115-a) for an access network, or between a first UE and a second UE for sidelink communications. In some cases, a network control node may be one of the first wireless node and the second wireless node (e.g., the base station 105-a for an access network) or another node different from the first wireless node and the second wireless node (e.g., the base station 105-a) for sidelink communications. In some cases, the base station 105-a may use a repeater 205 (e.g., a network-controlled repeater) to extend coverage and enable communications with the UE 115-a. For example, the UE 115-a may operate outside of a coverage area of the base station 105-a, or there may be an interference 215 which may block transmissions between the UE 115-a and the base station 105-a. The interference 215 may be a building or other physical blockage, or may be a distance (e.g., if the distance between the UE 115-a and the base station 105-a is too far, then the repeater 205 may be used). The base station 105-a may transmit signaling to the repeater 205 via a communications link 210-a, and the repeater 205 may retransmit the signaling to the UE 115-a via a communications link 210-b.

In some cases, the performance of the repeater 205 may be impacted by TDD patterns of the signals being repeated by the repeater 205. For example, the repeater 205 may be limited by a maximum amplification gain (e.g., Gmax) that may be applied to signals received by the repeater due to a stability concern. For example, if the gain of the repeater is too high, the signal transmitted by the repeater may be detected by the receivers of the repeater, thereby creating a feedback loop that distorts and interferes with the signal transmitted by the repeater (e.g., similar to feedback interference that may occur when a microphone comes too close to a speaker associated with the microphone). For instance, the value of Gmax that may be applied to the signals may depend on whether the repeater 205 is aware of TDD configuration or pattern of a time resource. In some examples, without information the TDD pattern of a channel, the repeater 205 may keep two radio frequency chains on (e.g., a downlink radio frequency chain and an uplink radio frequency chain). In some cases, the coupling between the two active radio frequency chains (e.g., coupling between beams pointing in a similar direction) may impact the stability of the repeater 205 and lead to a relatively low value for Gmax (e.g., 50 dB) (e.g., to ensure stability). If the repeater 205 has information regarding whether the if communications are uplink communications or downlink communications at a time resource, the repeater 205 may adjust parameters of one radio frequency chain for the active direction and adjust parameters of the other radio frequency chain (e.g., set a low gain value for the other radio frequency chain) or deactivate the other radio frequency chain. As such, the coupling between the two radio frequency chains may be reduced and the active radio frequency chain may work at a higher Gmax (e.g., 100 dB).

In 5G NR, a time resource may be indicated as a downlink resource, an uplink resource, or a flexible resource. A flexible resource (e.g., a resource that could be assigned for downlink communications or uplink communications) may be overridden (e.g., converted) into a downlink resource or an uplink resource at a later time by another signaling message. In some cases, a TDD pattern (or TDD configuration, as it may be called in some instances) may be conveyed in different signaling and with different levels of specificity. For example, the TDD pattern may be indicated by a common TDD configuration associated with a cell (e.g., a cell-specific TDDConfigCommon), which may be broadcast by the base station 105-a in a system information block (SIB) (e.g., SIB1). In some cases, the TDDConfigCommon may indicate a slot or symbol as a downlink resource, an uplink resource, or a flexible resource. Additionally or alternatively, the TDD pattern may be indicated by a dedicated TDD configuration specific to the UE 115-a (e.g., a UE-specific TDDConfigDedicated), which may be sent via an RRC reconfiguration message. In some examples, the TDD pattern may be indicated by an SFI, which may be sent via physical downlink control channel (PDCCH) control signaling such as downlink control information (DCI) (e.g., DCI format DCI2_0). In some cases, rules may be defined for overriding flexible resources. For example, the TDDConfigDedicated may override flexible resources indicated by TDDConfigCommon into downlink resources and uplink resources, and the SFI may override flexible resources indicated by TDDConfigCommon, TDDConfigDedicated, or both into downlink resources and uplink resources.

Depending on the implementation, the repeater 205 may have information regarding whether the communications are downlink communications or are uplink communications for a first subset of time resources (e.g., a resource subset 235-a), but may lack information regarding whether the communications are downlink or uplink for a second subset of time resources (e.g., a resource subset 235-b). For example, the side information for the repeater 205 may indicate that some communication resources are to be used for downlink or uplink for a subset of resources (e.g., downlink resources 240 and uplink resources 245 in the resource subset 235-a) and may indicate the remaining resources as flexible resources (e.g., flexible resources 250 in the resource subset 235-b). In some cases, the downlink resources 240 and the uplink resources 245 in the resource subset 235-a may be TDMed as shown, or FDMed. Flexible resources may be resources that may be used for uplink or downlink and may be scheduled at a later time. The repeater 205 may lack information on whether the flexible resources 250 may be overridden to the downlink resources 240 or the uplink resources 245.

In some cases, an autonomous smart repeater may be able to decode the broadcast SIB1 message to receive the common TDD configuration associated with a cell (e.g., a cell-specific TDDConfigCommon), and may be unaware of the dedicated TDD configuration specific to the UE 115-a (e.g., a UE-specific TDDConfigDedicated) or the SFI or both. As such, for the flexible resources indicated by TDDConfigCommon, the autonomous smart repeater may lack the techniques to determine whether the resources may be downlink resources or uplink resources because those flexible resources may be scheduled by the dedicated TDD configuration or by the SFI or both. In some cases, a network-controlled repeater (e.g., the repeater 205) may be provided (e.g., by the base station 105-a) with semi-static TDD information (e.g., TDDConfigCommon and TDDConfigDedicated), but may lack dynamic SFI. As such, for the flexible resources 250 indicated by TDDConfigDedicated, the repeater 205 may lack the techniques to determine whether the flexible resources 250 may be downlink resources 240 or uplink resources 245. In some cases, using a power detection algorithm adopted by the repeater 205, the repeater 205 may be able to detect a subset of resources as downlink or uplink with high confidence, but may treat remaining resources as flexible resources 250 that may be configured for uplink communications or downlink communications.

The repeater 205 may operate differently between the first subset of time resources (e.g., the resource subset 235-a that may be configured for uplink communications or downlink communications by the repeater 205) and the second subset of time resources (e.g., the repeater 205 may not know whether the resource subset 235-b is configured for uplink communications or downlink communications), which may lead to different end-to-end channel states (e.g., signal-to-interference and noise ratio (SINR) values) between the two subsets of time resources. In some examples, the repeater 205 may apply different Gmax constraints on its various radio frequency chains at a time resource depending on whether or not the repeater 205 knows that the resources are configured for uplink communications or downlink communications. In some cases, the repeater 205 may have one or more radio frequency chains for receiving, transmission, uplink, downlink, or any combination thereof. For example, the repeater 205 may adopt three options for its amplification constraints (e.g., Gmax1=70 dB, Gmax2=50 dB, Gmax3=30 dB). At the first subset of resources configured for uplink communications or downlink communications, the repeater 205 may apply Gmax1=70 dB on the radio frequency chain for the active uplink communications or downlink communications and Gmax3=30 dB on the radio frequency chain for the inactive uplink communications or downlink communications. At the second subset of resources for which the repeater 205 may not know whether the second set of resources is configured for uplink communications or downlink communications, the repeater 205 may apply Gmax2=50 dB on one or more radio frequency chains.

In some cases, a network control node (e.g., the base station 105-a) may be aware of the presence of the repeater 205 and the capability of the repeater 205 on TDD pattern detection of a channel. For example, the repeater 205 may transmit its capability 220 to detect a TDD pattern via the communications link 210-a. The base station 105-a may configure different sets of channel measurements for the UE 115-*a* based on the capability, which may include transmitting one or more parameters associated with the UE 115-*a* performing channel measurements and reference signals for the channel measurements. In some cases, the base station 105-*a* may also receive an indication of a configuration of the repeater 205, which may be used to transmit the parameters to the UE 115-*a*. The base station 105-*a* may be aware of the configuration of the repeater 205 and the capability 220 of the repeater 205 via an operation administration and maintenance (OAM) configuration or by a signaling report from the repeater 205. In some cases, the base station 105-*a* may schedule communication resources 230 for communications with the UE 115-*a* via the repeater 205. Upon retransmitting information (e.g., the parameters and reference signals) from the base station 105-*a* to the UE 115-*a* using the communication resources 230, the repeater 205 may determine whether the information includes downlink information or uplink information, and may use that determination to detect TDD patterns.

The base station 105-*a* may transmit a TDD configuration 225 to the repeater 205 via the communications link 210-*a* based on the capability 220 of the repeater 205. For example, the base station 105-*a* may configure a first set of channel measurements on resources in the resource subset 235-*a* configured for uplink communications or downlink communications at the repeater 205, and may configure a second set of channel measurements on resources in the resource subset 235-*b* which the repeater 205 may not know are configured for uplink communications or downlink communications at the repeater 205. As such, the base station 105-*a* may transmit the TDD configuration 225 based on its knowledge of the capability 220 of the repeater 205 on TDD pattern detection, or based on a feedback message from the repeater 205 (e.g., if such a control interface exists).

In some examples, if the repeater 205 may detect TDD patterns via acquiring TDDConfigComm, then the base station 105-*a* may configure the first set of channel measurements on the resource subset 235-*a*, which may include downlink resources 240 and uplink resources 245 indicated by TDDConfigComm, and may configure the second set of channel measurements on the resource subset 235-*b*, which may include flexible resources 250 indicated by TDDConfigComm. In some cases, if the repeater 205 has knowledge of both TDDConfigComm and TDDConfigDedicated via a network-provided control interface, then the base station 105-*a* may configure the first set of channel measurements on the downlink resources 240 and the uplink resources 245 indicated by TDDConfigDedicated, and may configure the second set of channel measurements on the flexible resources 250 indicated by TDDConfigDedicated. In some cases, the repeater 205 may report the resource subsets 235 whether or not the resources are configured for uplink communications or downlink communications, and the base station 105-*a* may configure channel measurements for the UE 115-*a* based on the report. In some cases, a 5G NR CSI framework may support multiple channel measurements via a proper configuration of CSI-RS resource sets.

The base station 105-*a* may make different scheduling decisions, configurations, or both on different sets of time resources (e.g., the resource subset 235-*a* and the resource subset 235-*b*) for communication between the base station 105-*a* and the UE 115-*b* based on whether the repeater knows the TDD pattern for the communications. Additionally or alternatively, the base station 105-*a* may make different scheduling decisions, configurations, or both on different sets of time resources (e.g., the resource subset 235-*a* and the resource subset 235-*b*) for communication between the base station 105-*a* and the UE 115-*b* based on the measurement results on the resource subsets 235 by the UE 115-*a*. The scheduling decisions, configurations, or both may be based on the configuration of the repeater 205 and the capability 220 of the repeater on TDD pattern detection. The capability of the repeater 205 may refer to an indication of what types of configurations the repeater 205 is capable of using for its operation. The configuration of the repeater 205 may refer to an indication of exactly what type the repeater is currently using. The base station 105-*a* may schedule different configurations of reference signals depending on whether the repeater 205 has knowledge of the TDD pattern through signaling, whether the repeater 205 has knowledge of the TDD pattern through detecting signals, or whether the repeater 205 does not have knowledge of the TDD pattern, or combination thereof. The base station 105-*a* may make scheduling decisions for communications between the base station 105-*a* and the UE 115-*a* including a modulation and coding scheme (MCS), a rank, a quantity of beams, or a combination thereof. In some examples, the base station 105-*a* may configure the scheduled node (e.g., the base station 105-*a*, the UE 115-*a*, or both) with power control parameters, a resource configuration, or a combination thereof. The base station 105-*a* may also transmit a configuration to the repeater 205 (e.g., a network-controlled repeater) including a power configuration associated with the channel, additional TDD parameters associated with the channel, or both.

Figure 3:
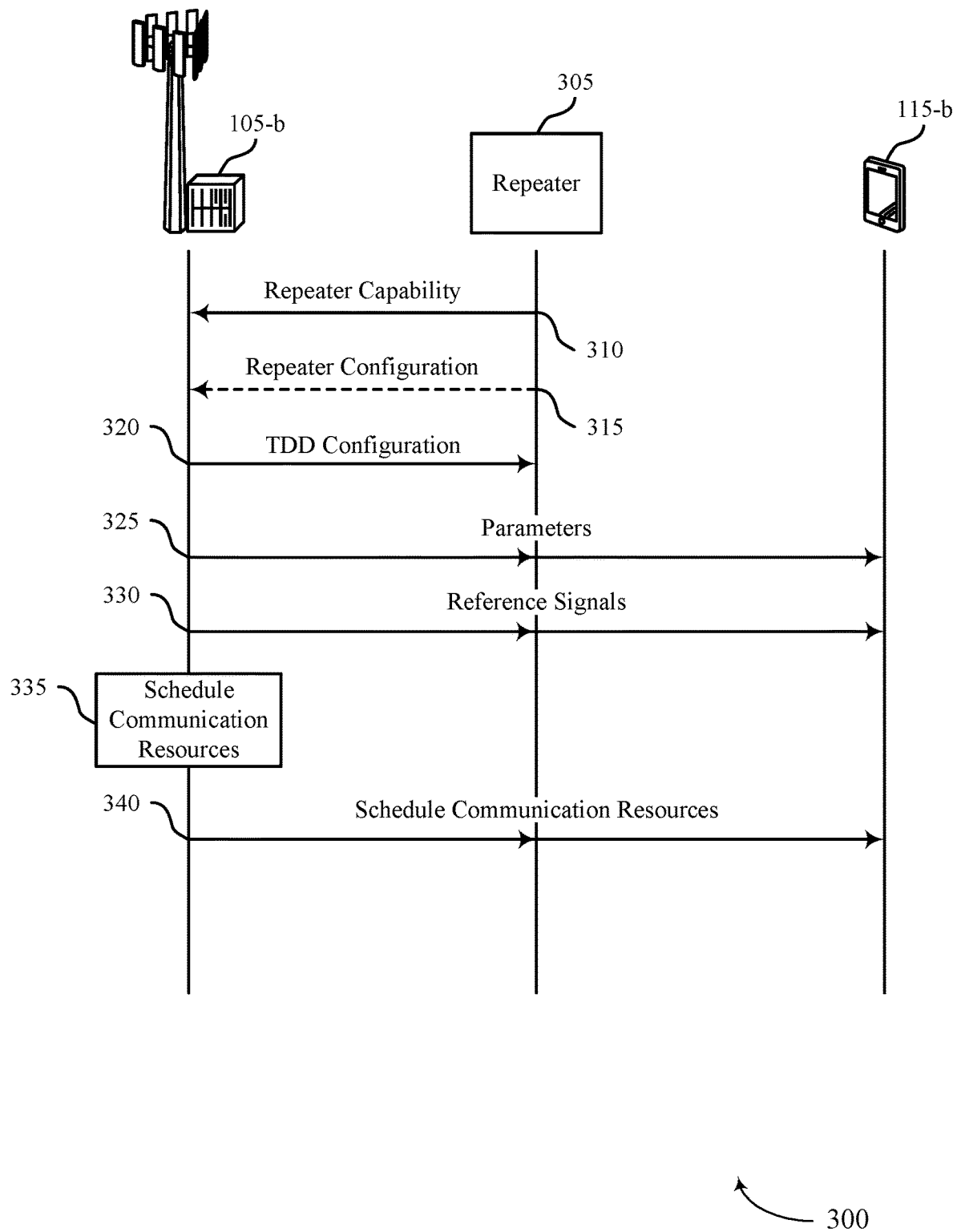
FIG. 3 illustrates an example of a process flow that supports TDD pattern detection for repeaters in accordance with aspects of the present disclosure.

FIG. 3 illustrates an example of a process flow 300 that supports TDD pattern detection for repeaters in accordance with aspects of the present disclosure. The process flow 300 may implement aspects of wireless communications systems 100 and 200, or may be implemented by aspects of the wireless communications system 100 and 200. For example, the process flow 300 may illustrate operations between a base station 105-*b*, a repeater 305, and a UE 115-*b* which may be examples of corresponding devices described with reference to FIGS. 1 and 2. In the following description of the process flow 300, the operations between the base station 105-*b*, the repeater 305, and the UE 115-*b* may be transmitted in a different order than the example order shown, or the operations performed by the base station 105-*b*, the repeater 305, and the UE 115-*b* may be performed in different orders or at different times. Some operations may also be omitted from the process flow 300, and other operations may be added to the process flow 300.

At 310, the base station 105-*b* (e.g., a network control node) may receive a first indication of a capability of the repeater 305 to detect a TDD pattern of a channel that communicates information between two nodes (e.g., the base station 105-*b* and the UE 115-*b*) using the repeater 305. Examples of different capabilities the repeater 305 may include detect the TDD pattern may include the capability to decode SFI indications (e.g., in DCI), the capability to decode TDDConfigDedicated indications (e.g., in RRC reconfiguration messages), the capability to decode TDDConfigComm indications (e.g., in SIB), the capability to detect channel conditions as the UE 115-*b* and base station 105-*b* communicate via the repeater 305, or any combination thereof. In some cases, the first indication may include a first capability that the repeater 305 is capable of decoding a SIB, a second capability that the repeater 305 is capable of decoding an RRC reconfiguration message, a third capability that the repeater 305 is capable of decoding DCI, a fourth capability that the repeater 305 is capable of detecting whether a communication resource is used to communicate uplink information or downlink information, or a combination thereof. In some cases, the base station 105-b may configure different sets of channel measurements for the UE 115-b based on the capability of the repeater 305.

At 315, the base station 105-b may receive a second indication of a configuration of the repeater 305. For example, the repeater 305 may communicate to the base station 105-b whether the repeater 305 is operating in a mode that allows the decoding of some types of messages (e.g., decoding of SIBs, RRC messages, or DCI). The configuration of the repeater 305 may include other parameters being used by the repeater 305, such as gain for radio frequency chains and other components. In some cases, the base station 105-b may make scheduling decisions, configurations, or both on multiple sets of time resources between the base station 105-b and the UE 115-b based on the capability and the configuration of the repeater 305.

At 320, the base station 105-b may transmit a second indication of a TDD configuration of the channel. In some cases, the second indication may include an information element communicated in a SIB which includes a common TDD configuration associated with a cell of the wireless network (e.g., a cell-specific TDDConfigCommon), an information element communicated in an RRC reconfiguration message, which includes a dedicated TDD configuration that is specific to the UE 115-b (e.g., a UE-specific TDDConfigDedicated), or an SFI communicated in DCI (e.g., DCI format DCI2_0). For example, as described with reference to FIG. 2, the base station 105-b may configure a first set of channel measurements on resources configured for uplink communications or downlink communications at the repeater 305, and a second set of channel measurements on resources which the repeater 305 may not know are configured for uplink communications or downlink communications at the repeater 305. In some cases, the indication of the TDD configuration 320 may be broadcast to other devices generally, may be transmitted to the repeater 305 or may be transmitted to the UE 115-b, or any combination thereof.

At 325, the base station 105-b may transmit, to the UE 115-b and via the repeater 305, one or more parameters associated with the UE 115-b performing one or more channel measurements based on the capability of the repeater to detect the TDD pattern. In some cases, the base station 105-b may transmit the parameters based on the configuration of the repeater 305. The parameters may comprise a power control parameter, a resource configuration, or a combination thereof. In some cases, the base station 105-b may transmit a third indication to perform a first set of channel measurements on a first set of resources indicated by the TDD pattern as uplink or downlink, and a fourth indication to perform a second set of channel measurements on a second set of resources indicated by the TDD pattern as flexibly configurable as either uplink or downlink. At 330, the base station 105-b may transmit, to the UE 115-b via the repeater 305, reference signals for the one or more channel measurements based on transmitting the one or more parameters.

At 335, the base station 105-b may schedule communication resources for communication with the UE 115-b via the repeater 305 based on the capability of the repeater to detect the TDD pattern of the channel. The base station may schedule the communication resources based on receiving the first indication. At 340, the base station 105-b may transmit, to the UE 115-b and via the repeater 305, a message that schedules the communication resources. As described with reference to FIG. 2, the communication resources may include downlink resources, uplink resources, flexible resources, or a combination thereof.

Figure 4:
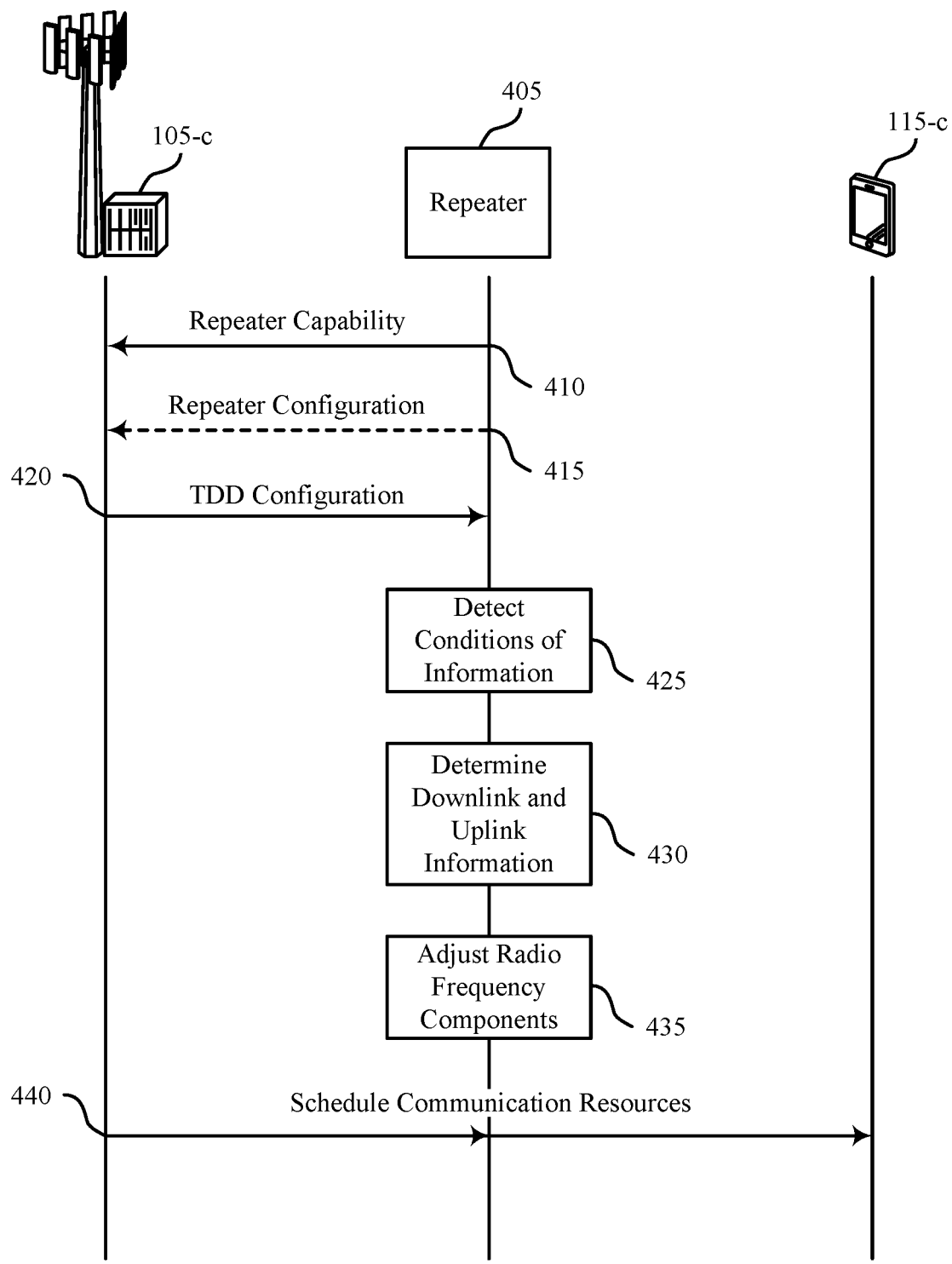
FIG. 4 illustrates an example of a process flow that supports TDD pattern detection for repeaters in accordance with aspects of the present disclosure.

FIG. 4 illustrates an example of a process flow 400 that supports TDD pattern detection for repeaters in accordance with aspects of the present disclosure. The process flow 400 may implement aspects of wireless communications systems 100 and 200, or may be implemented by aspects of the wireless communications system 100 and 200. For example, the process flow 400 may illustrate operations between a base station 105-c, a repeater 405, and a UE 115-c which may be examples of corresponding devices described with reference to FIGS. 1 and 2. In the following description of the process flow 400, the operations between the base station 105-c, the repeater 405, and the UE 115-c may be transmitted in a different order than the example order shown, or the operations performed by the base station 105-c, the repeater 405, and the UE 115-c may be performed in different orders or at different times. Some operations may also be omitted from the process flow 400, and other operations may be added to the process flow 400.

At 410, the base station 105-c (e.g., a network control node) may receive a first indication of a capability of the repeater 405 (e.g., a network-controlled repeater) to detect a TDD pattern of a channel that communicates information between two nodes (e.g., the base station 105-c and the UE 115-c) using the repeater 405. Examples of different capabilities the repeater 405 may include detect the TDD pattern may include the capability to decode SFI indications (e.g., in DCI), the capability to decode TDDConfigDedicated indications (e.g., in RRC reconfiguration messages), the capability to decode TDDConfigComm indications (e.g., in SIB), the capability to detect channel conditions as the UE 115-c and base station 105-c communicate via the repeater 405, or any combination thereof. In some cases, the first indication may include a first capability that the repeater 405 is capable of decoding a SIB, a second capability that the repeater 405 is capable of decoding an RRC reconfiguration message, a third capability that the repeater 405 is capable of decoding DCI, a fourth capability that the repeater 405 is capable of detecting whether a communication resource is used to communicate uplink information or downlink information, or a combination thereof. In some cases, the base station 105-c may configure different sets of channel measurements for the UE 115-c based on the capability of the repeater 405.

At 415, the base station 105-c may receive a second indication of a configuration of the repeater 405. For example, the repeater 405 may communicate to the base station 105-b whether the repeater 405 is operating in a mode that allows the decoding of some types of messages (e.g., decoding of SIBs, RRC messages, or DCI). The configuration of the repeater 405 may include other parameters being used by the repeater 405, such as gain for radio frequency chains and other components. In some cases, the base station 105-b may make scheduling decisions, configurations, or both on multiple sets of time resources between the base station 105-b and the UE 115-b based on the capability and the configuration of the repeater 305.

At 420, the base station 105-c may transmit a second indication of a TDD configuration of the channel. In some cases, the second indication may include an information element communicated in a SIB which includes a common TDD configuration associated with a cell of the wireless network (e.g., a cell-specific TDDConfigCommon), an information element communicated in an RRC reconfiguration message, which includes a dedicated TDD configuration that is specific to the UE 115-c (e.g., a UE-specific TDDConfigDedicated), or an SFI communicated in DCI (e.g., DCI format DCI2_0). For example, as described with reference to FIG. 2, the base station 105-c may configure a first set of channel measurements on resources configured for uplink communications or downlink communications at the repeater 405, and a second set of channel measurements on resources which the repeater 405 may not know are configured for uplink communications or downlink communications at the repeater 405. In some cases, the indication of the TDD configuration 420 may be broadcast to other devices generally, may be transmitted to the repeater 405 or may be transmitted to the UE 115-c, or any combination thereof.

At 425, the repeater 405 may detect one or more conditions of information communicated between the two nodes (e.g., the base station 105-c and the UE 115-c) via the repeater 405. At 430, the repeater 405 may determine whether the information includes downlink information or uplink information based on detecting the one or more conditions. For example, as described with reference to FIG. 2, the repeater 405 may know that a set of resources for a first set of channel measurements by the UE 115-c are configured for uplink communications or downlink communications, but may not know that a set of resources for a second set of channel measurements are configured for uplink communications or downlink communications. In some cases, the repeater 405 may know downlink and uplink information based on a TDDConfigComm, a TDDConfigDedicated, or an SFI.

At 435, the repeater 405 may adjust one or more radio frequency components of the repeater 405 based on the second indication of the TDD pattern. In some cases, the repeater 405 may adjust the one or more radio frequency resources based on determining whether the information includes downlink information or uplink information.

At 440, the repeater 405 may receive from the base station 105-c a message that schedules communication resources for communication between the base station 105-c and the UE 115-c based on the capability of the repeater. The repeater 405 may retransmit the message that schedules the communication resources to the UE 115-c based on receiving the message. In some cases, the scheduled resources may be downlink resources, uplink resources, flexible resources, or a combination thereof.

Figure 5:
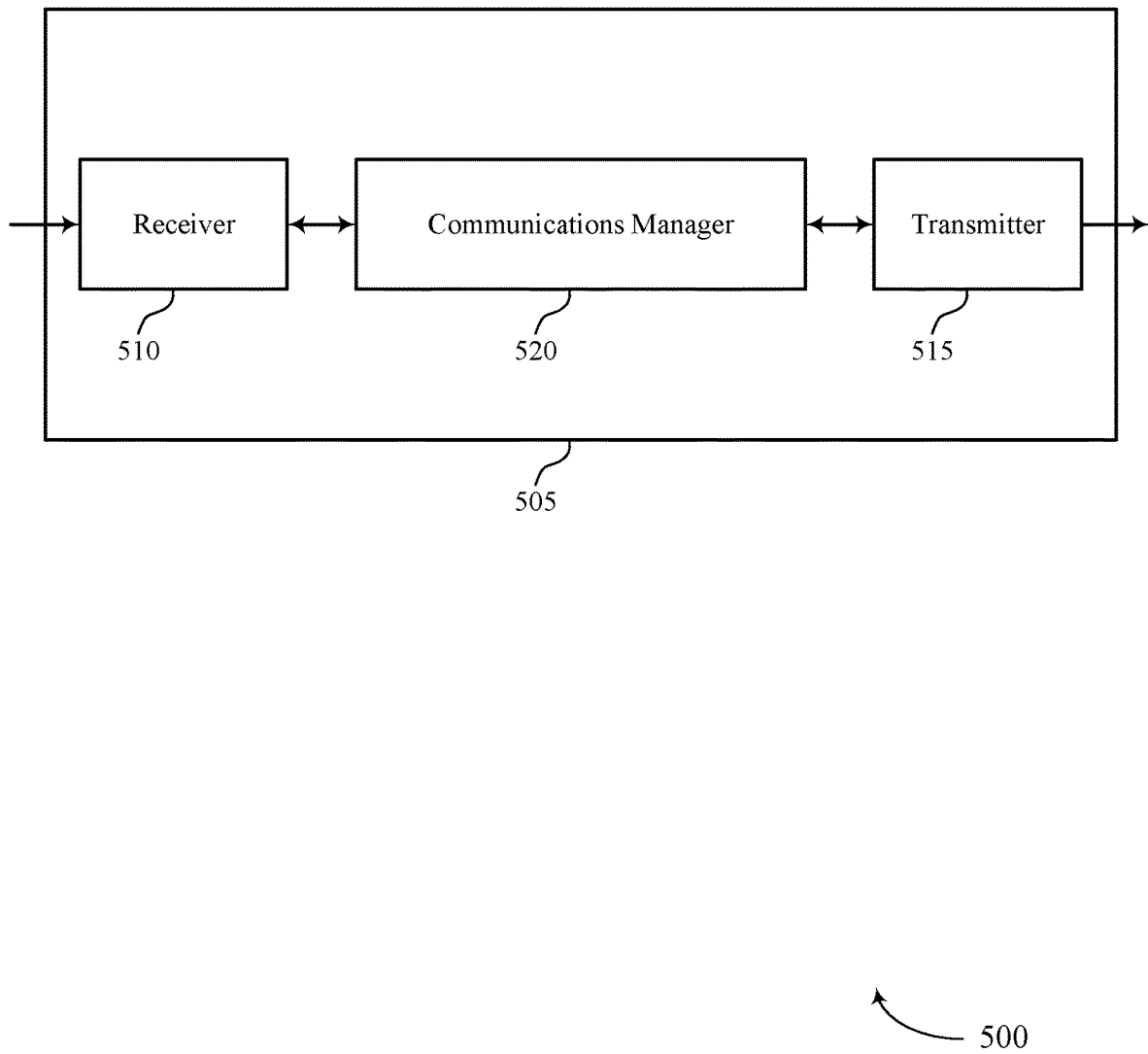
FIGS. 5 and 6 show block diagrams of devices that support TDD pattern detection for repeaters in accordance with aspects of the present disclosure.

FIG. 5 shows a block diagram 500 of a device 505 that supports TDD pattern detection for repeaters in accordance with aspects of the present disclosure. The device 505 may be an example of aspects of a network control node as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to TDD pattern detection for repeaters). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to TDD pattern detection for repeaters). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of TDD pattern detection for repeaters as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a network control node in accordance with examples as disclosed herein. For example, the communications manager 520 may be configured as or otherwise support a means for receiving a first indication of a capability of a repeater to detect a TDD pattern of a channel that communicates information between two nodes using the repeater. The communications manager 520 may be configured as or otherwise support a means for transmitting, to a UE and via the repeater, one or more parameters associated with the UE performing one or more channel measurements based on the capability of the repeater to detect the TDD pattern. The communications manager 520 may be configured as or otherwise support a means for transmitting, to the UE via the repeater, reference signals for the one or more channel measurements based on transmitting the one or more parameters.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for TDD pattern detection for repeaters, which may increase coverage and reduce signaling overhead. Further, in some examples, the repeater capability to detect TDD patterns as described herein may support a higher amplification gain at the repeater, which may improve the overall quality of communications between wireless nodes, thereby improving latency and reliability for an improved user experience.

Figure 6:
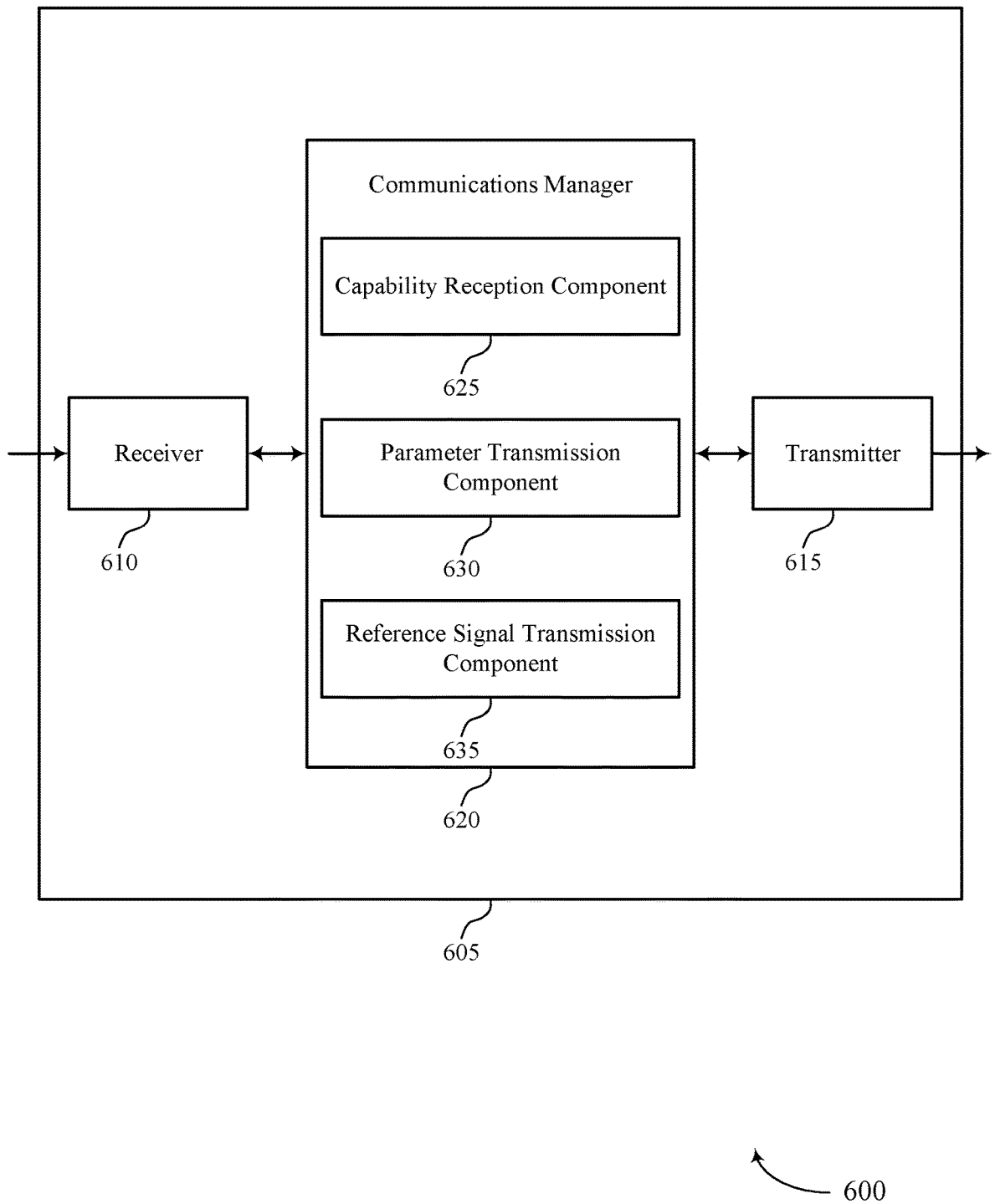

FIG. 6 shows a block diagram 600 of a device 605 that supports TDD pattern detection for repeaters in accordance with aspects of the present disclosure. The device 605 may be an example of aspects of a device 505 or a network control node as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to TDD pattern detection for repeaters). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to TDD pattern detection for repeaters). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of TDD pattern detection for repeaters as described herein. For example, the communications manager 620 may include a capability reception component 625, a parameter transmission component 630, a reference signal transmission component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a network control node in accordance with examples as disclosed herein. The capability reception component 625 may be configured as or otherwise support a means for receiving a first indication of a capability of a repeater to detect a TDD pattern of a channel that communicates information between two nodes using the repeater. The parameter transmission component 630 may be configured as or otherwise support a means for transmitting, to a UE and via the repeater, one or more parameters associated with the UE performing one or more channel measurements based on the capability of the repeater to detect the TDD pattern. The reference signal transmission component 635 may be configured as or otherwise support a means for transmitting, to the UE via the repeater, reference signals for the one or more channel measurements based on transmitting the one or more parameters.

Figure 7:
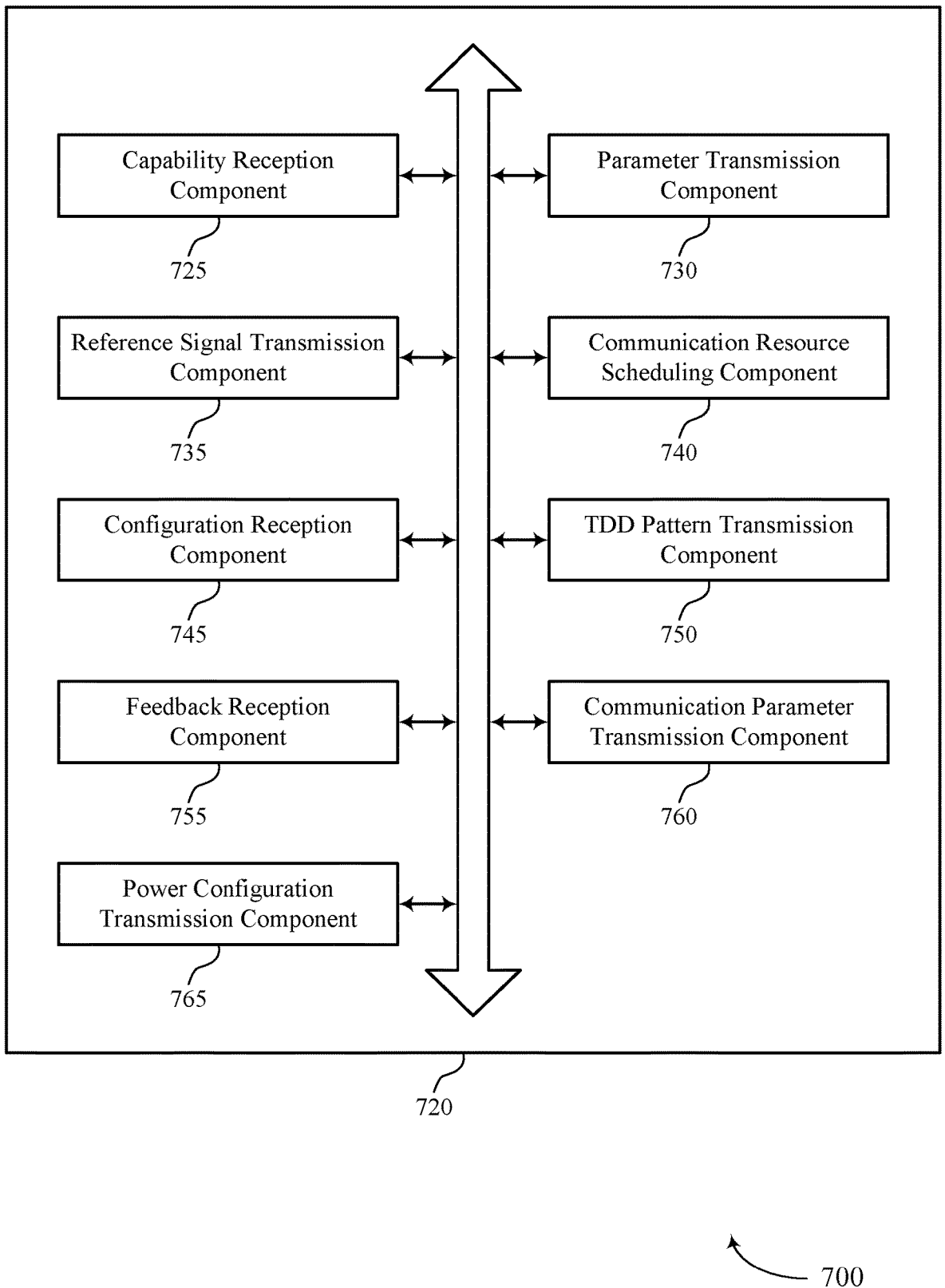
FIG. 7 shows a block diagram of a communications manager that supports TDD pattern detection for repeaters in accordance with aspects of the present disclosure.

FIG. 7 shows a block diagram 700 of a communications manager 720 that supports TDD pattern detection for repeaters in accordance with aspects of the present disclosure. The communications manager 720 may be an example of aspects of a communications manager 520, a communications manager 620, or both, as described herein. The communications manager 720, or various components thereof, may be an example of means for performing various aspects of TDD pattern detection for repeaters as described herein. For example, the communications manager 720 may include a capability reception component 725, a parameter transmission component 730, a reference signal transmission component 735, a communication resource scheduling component 740, a configuration reception component 745, a TDD pattern transmission component 750, a feedback reception component 755, a communication parameter transmission component 760, a power configuration transmission component 765, or any combination thereof. Each of these components may communicate, directly or indirectly, with one another (e.g., via one or more buses).

The communications manager 720 may support wireless communication at a network control node in accordance with examples as disclosed herein. The capability reception component 725 may be configured as or otherwise support a means for receiving a first indication of a capability of a repeater to detect a TDD pattern of a channel that communicates information between two nodes using the repeater. The parameter transmission component 730 may be configured as or otherwise support a means for transmitting, to a UE and via the repeater, one or more parameters associated with the UE performing one or more channel measurements based on the capability of the repeater to detect the TDD pattern. The reference signal transmission component 735 may be configured as or otherwise support a means for transmitting, to the UE via the repeater, reference signals for the one or more channel measurements based on transmitting the one or more parameters.

In some examples, the communication resource scheduling component 740 may be configured as or otherwise support a means for scheduling communication resources for communication with the UE via the repeater based on the capability of the repeater to detect the TDD pattern of the channel based on receiving the first indication. In some examples, the communication resource scheduling component 740 may be configured as or otherwise support a means for transmitting, to the UE via the repeater, a message that schedules the communication resources.

In some examples, the configuration reception component 745 may be configured as or otherwise support a means for receiving a second indication of a configuration of the repeater, where transmitting the one or more parameters is based on the configuration of the repeater, where the one or more parameters associated with the UE performing the one or more channel measurements are based on the configuration of the repeater and the capability of the repeater.

In some examples, the TDD pattern transmission component 750 may be configured as or otherwise support a means for transmitting a second indication of TDD pattern of the channel, where transmitting the one or more parameters is based on transmitting the second indication.

In some examples, the second indication includes an information element communicated in a SIB, the information element including a common TDD configuration associated with a cell of a wireless network.

In some examples, the second indication includes an information element communicated in an RRC reconfiguration message, the information element including a dedicated TDD configuration that is specific to the UE.

In some examples, the second indication includes an SFI communicated in DCI, a specific slot format in the SFI associated with the UE in a serving cell.

In some examples, to support transmitting the one or more parameters associated with the UE performing the one or more channel measurements, the parameter transmission component 730 may be configured as or otherwise support a means for transmitting, based on the second indication, a third indication to perform a first set of channel measurements on a first set of resources indicated by the TDD pattern as uplink or downlink and a fourth indication to perform a second set of channel measurements on a second set of resources indicated by the TDD pattern as flexibly configurable as either uplink or downlink.

In some examples, the feedback reception component 755 may be configured as or otherwise support a means for receiving, from the repeater, a feedback message indicating one or more conditions associated with the repeater. In some examples, the parameter transmission component 730 may be configured as or otherwise support a means for transmitting, to the UE and via the repeater, the one or more parameters associated with the UE performing the one or more channel measurements based on receiving the feedback message.

In some examples, the one or more parameters includes a power control parameter, a resource configuration, or a combination thereof.

In some examples, the first indication includes a first capability that the repeater is capable of decoding system block information, a second capability that the repeater is capable of decoding an RRC reconfiguration message, a third capability that the repeater is capable of decoding DCI, a fourth capability that the repeater is capable of detecting whether a communication resource is used to communicate uplink information or downlink information, or a combination thereof.

In some examples, the repeater is a traditional repeater configured to receive and amplify signals independent of control information about the TDD pattern of the channel, an autonomous repeater configured to identify information about the TDD pattern of the channel based on channel conditions at the repeater, or a network-controlled repeater configured to receive the control information about the TDD pattern of the channel.

In some examples, the communication parameter transmission component 760 may be configured as or otherwise support a means for transmitting a second indication of communication parameters for communications between the UE and the network control node based on the capability of the repeater, the communication parameters including an MCS, a rank, a quantity of beams, or a combination thereof.

In some examples, the power configuration transmission component 765 may be configured as or otherwise support a means for transmitting, to the repeater, a power configuration associated with the channel, the TDD pattern associated with the channel, or a combination thereof based on the capability of the repeater.

In some examples, the network control node includes a base station, a UE, or a combination thereof.

Figure 8:
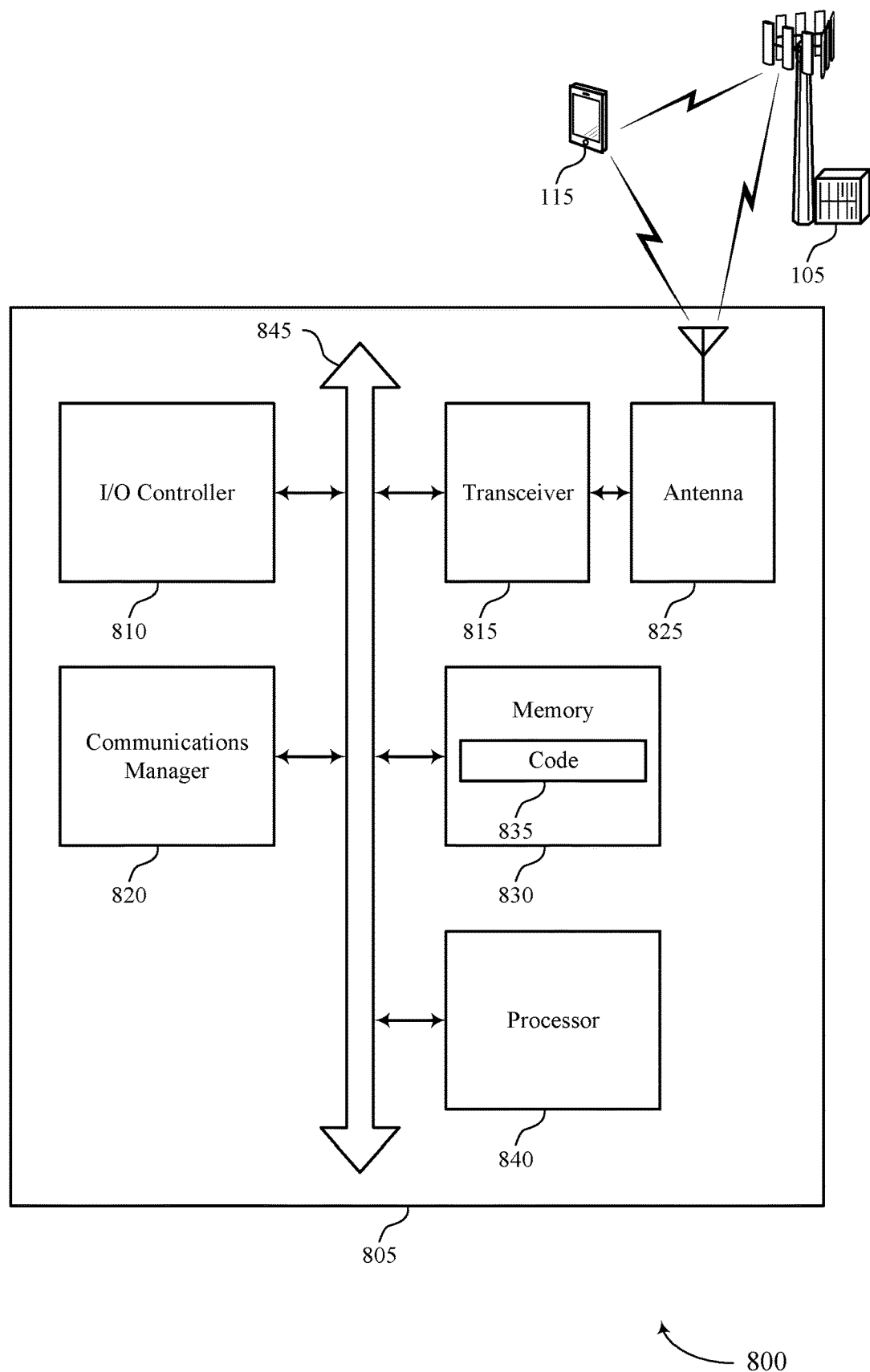
FIG. 8 shows a diagram of a system including a device that supports TDD pattern detection for repeaters in accordance with aspects of the present disclosure.

FIG. 8 shows a diagram of a system 800 including a device 805 that supports TDD pattern detection for repeaters in accordance with aspects of the present disclosure. The device 805 may be an example of or include the components of a device 505, a device 605, or a network control node as described herein. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random-access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic input/output system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting TDD pattern detection for repeaters). For example, the device 805 or a component of the device 805 may include a processor 840 and memory 830 coupled to the processor 840, the processor 840 and memory 830 configured to perform various functions described herein.

The communications manager 820 may support wireless communication at a network control node in accordance with examples as disclosed herein. For example, the communications manager 820 may be configured as or otherwise support a means for receiving a first indication of a capability of a repeater to detect a TDD pattern of a channel that communicates information between two nodes using the repeater. The communications manager 820 may be configured as or otherwise support a means for transmitting, to a UE and via the repeater, one or more parameters associated with the UE performing one or more channel measurements based on the capability of the repeater to detect the TDD pattern. The communications manager 820 may be configured as or otherwise support a means for transmitting, to the UE via the repeater, reference signals for the one or more channel measurements based on transmitting the one or more parameters.

By including or configuring the communications manager 820 in accordance with examples as described herein, the device 805 may support techniques for TDD pattern detection for repeaters, which may increase coverage and reduce signaling overhead. Further, in some examples, the repeater capability to detect TDD patterns as described herein may support a higher amplification gain at the repeater, which may improve the overall quality of communications between wireless nodes, thereby improving latency and reliability for an improved user experience.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of TDD pattern detection for repeaters as described herein, or the processor 840 and the memory 830 may be otherwise configured to perform or support such operations.

Figure 9:
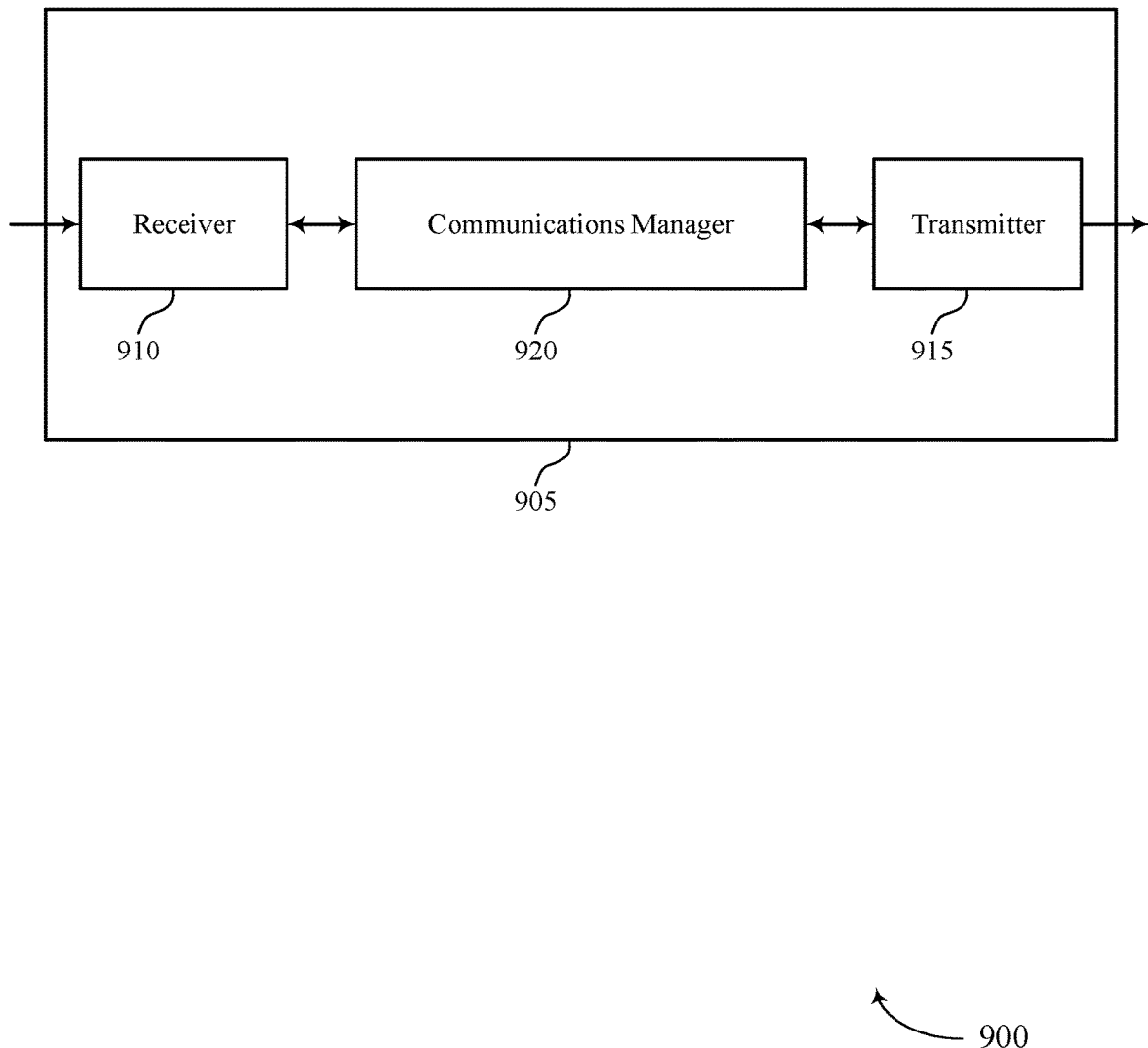
FIGS. 9 and 10 show block diagrams of devices that support TDD pattern detection for repeaters in accordance with aspects of the present disclosure.

FIG. 9 shows a block diagram 900 of a device 905 that supports TDD pattern detection for repeaters in accordance with aspects of the present disclosure. The device 905 may be an example of aspects of a repeater as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to TDD pattern detection for repeaters). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to TDD pattern detection for repeaters). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of TDD pattern detection for repeaters as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a repeater in accordance with examples as disclosed herein. For example, the communications manager 920 may be configured as or otherwise support a means for transmitting, to a network control node, a first indication of a capability of the repeater to detect a TDD pattern of a channel that communicates information between two nodes using the repeater. The communications manager 920 may be configured as or otherwise support a means for receiving a second indication of the TDD pattern of the channel based on transmitting the capability of the repeater. The communications manager 920 may be configured as or otherwise support a means for adjusting one or more radio frequency components of the repeater based on the second indication of the TDD pattern.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for TDD pattern detection for repeaters, which may increase coverage and reduce signaling overhead. Further, in some examples, the repeater capability to detect TDD patterns as described herein may support a higher amplification gain at the repeater, which may improve the overall quality of communications between wireless nodes, thereby improving latency and reliability for an improved user experience.

Figure 10:
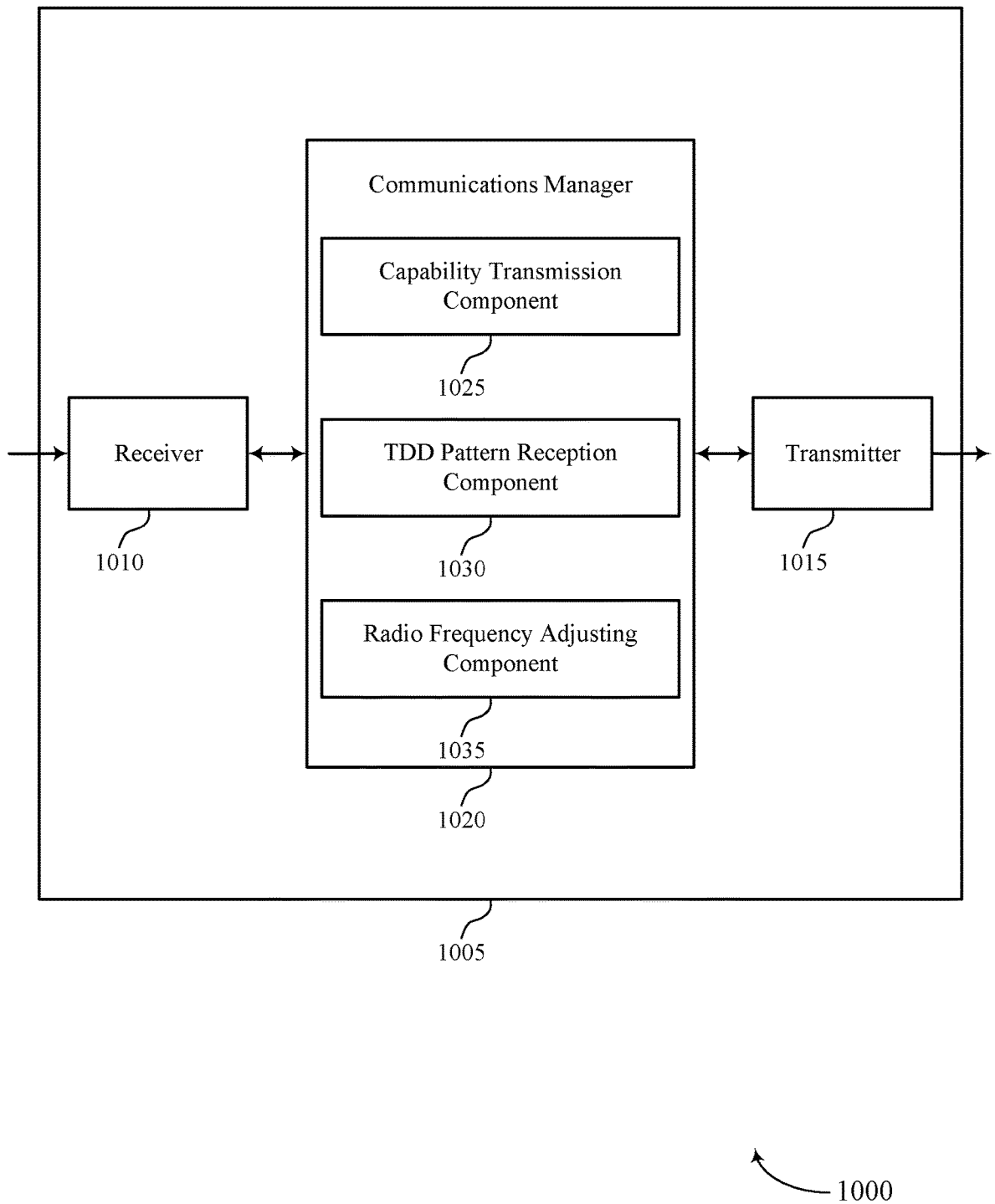

FIG. 10 shows a block diagram 1000 of a device 1005 that supports TDD detection for repeaters in accordance with aspects of the present disclosure. The device 1005 may be an example of aspects of a device 905 or a repeater as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to TDD pattern detection for repeaters). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to TDD pattern detection for repeaters). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of TDD pattern detection for repeaters as described herein. For example, the communications manager 1020 may include a capability transmission component 1025, a TDD pattern reception component 1030, a radio frequency adjusting component 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a repeater in accordance with examples as disclosed herein. The capability transmission component 1025 may be configured as or otherwise support a means for transmitting, to a network control node, a first indication of a capability of the repeater to detect a TDD pattern of a channel that communicates information between two nodes using the repeater. The TDD pattern reception component 1030 may be configured as or otherwise support a means for receiving a second indication of the TDD pattern of the channel based on transmitting the capability of the repeater. The radio frequency adjusting component 1035 may be configured as or otherwise support a means for adjusting one or more radio frequency components of the repeater based on the second indication of the TDD pattern.

Figure 11:
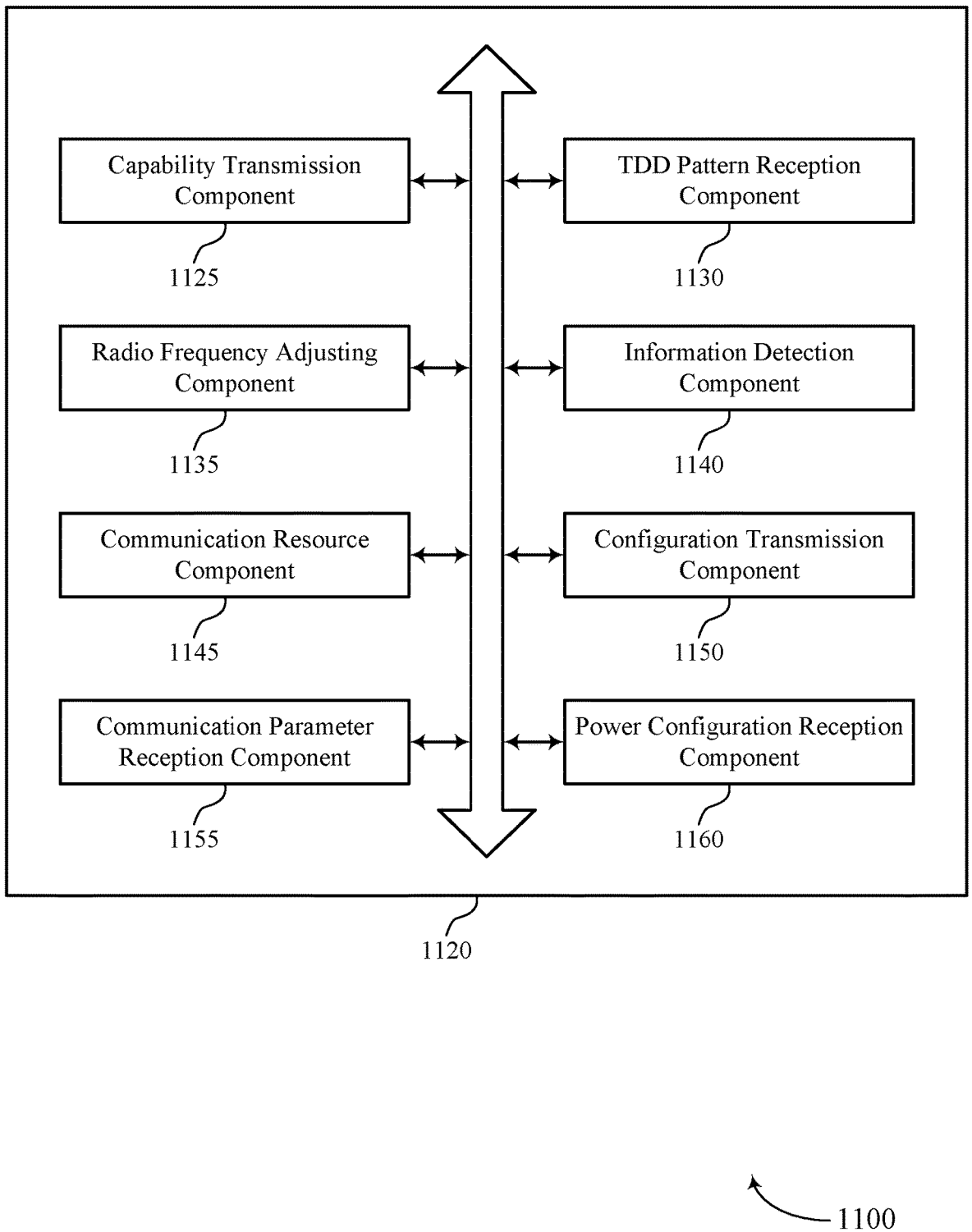
FIG. 11 shows a block diagram of a communications manager that supports TDD pattern detection for repeaters in accordance with aspects of the present disclosure.

FIG. 11 shows a block diagram 1100 of a communications manager 1120 that supports TDD pattern detection for repeaters in accordance with aspects of the present disclosure. The communications manager 1120 may be an example of aspects of a communications manager 920, a communications manager 1020, or both, as described herein. The communications manager 1120, or various components thereof, may be an example of means for performing various aspects of TDD pattern detection for repeaters as described herein. For example, the communications manager 1120 may include a capability transmission component 1125, a TDD pattern reception component 1130, a radio frequency adjusting component 1135, an information detection component 1140, a communication resource component 1145, a configuration transmission component 1150, a communication parameter reception component 1155, a power configuration reception component 1160, or any combination thereof. Each of these components may communicate, directly or indirectly, with one another (e.g., via one or more buses).

The communications manager 1120 may support wireless communication at a repeater in accordance with examples as disclosed herein. The capability transmission component 1125 may be configured as or otherwise support a means for transmitting, to a network control node, a first indication of a capability of the repeater to detect a TDD pattern of a channel that communicates information between two nodes using the repeater. The TDD pattern reception component 1130 may be configured as or otherwise support a means for receiving a second indication of the TDD pattern of the channel based on transmitting the capability of the repeater. The radio frequency adjusting component 1135 may be configured as or otherwise support a means for adjusting one or more radio frequency components of the repeater based on the second indication of the TDD pattern.

In some examples, the information detection component 1140 may be configured as or otherwise support a means for detecting one or more conditions of information communicated between the two nodes via the repeater. In some examples, the information detection component 1140 may be configured as or otherwise support a means for determining whether the information includes downlink information or uplink information based on detecting the one or more conditions, where adjusting the one or more radio frequency components is based on the determination.

In some examples, the communication resource component 1145 may be configured as or otherwise support a means for receiving, from the network control node, a message that schedules communication resources for communication between the network control node and a UE based on the capability of the repeater. In some examples, the communication resource component 1145 may be configured as or otherwise support a means for retransmitting the message that schedules the communication resources to the UE based on receiving the message.

In some examples, the second indication includes an information element communicated in a SIB, the information element including a common TDD configuration associated with a cell of a wireless network.

In some examples, the second indication includes an information element communicated in an RRC reconfiguration message, the information element including a dedicated TDD configuration that is specific to the UE.

In some examples, the second indication includes an SFI communicated in DCI, a specific slot format in the SFI associated with the UE in a serving cell.

In some examples, the configuration transmission component 1150 may be configured as or otherwise support a means for transmitting a third indication of a configuration of the repeater, where receiving the second indication is based on the configuration of the repeater.

In some examples, the first indication includes a first capability that the repeater is capable of decoding system block information, a second capability that the repeater is capable of decoding an RRC reconfiguration message, a third capability that the repeater is capable of decoding DCI, a fourth capability that the repeater is capable of detecting whether a communication resource is used to communicate uplink information or downlink information, or a combination thereof.

In some examples, the repeater includes a network-controlled repeater configured to receive control information about the TDD pattern of the channel.

In some examples, the communication parameter reception component 1155 may be configured as or otherwise support a means for receiving a third indication of communication parameters for communications between the UE and the network control node based on the capability of the repeater, the communication parameters including an MCS, a rank, a quantity of beams, or a combination thereof.

In some examples, the power configuration reception component 1160 may be configured as or otherwise support a means for receiving, from the network control node, a power configuration associated with the channel, the TDD pattern associated with the channel, or a combination thereof based on the capability of the repeater to detect the TDD pattern.

Figure 12:
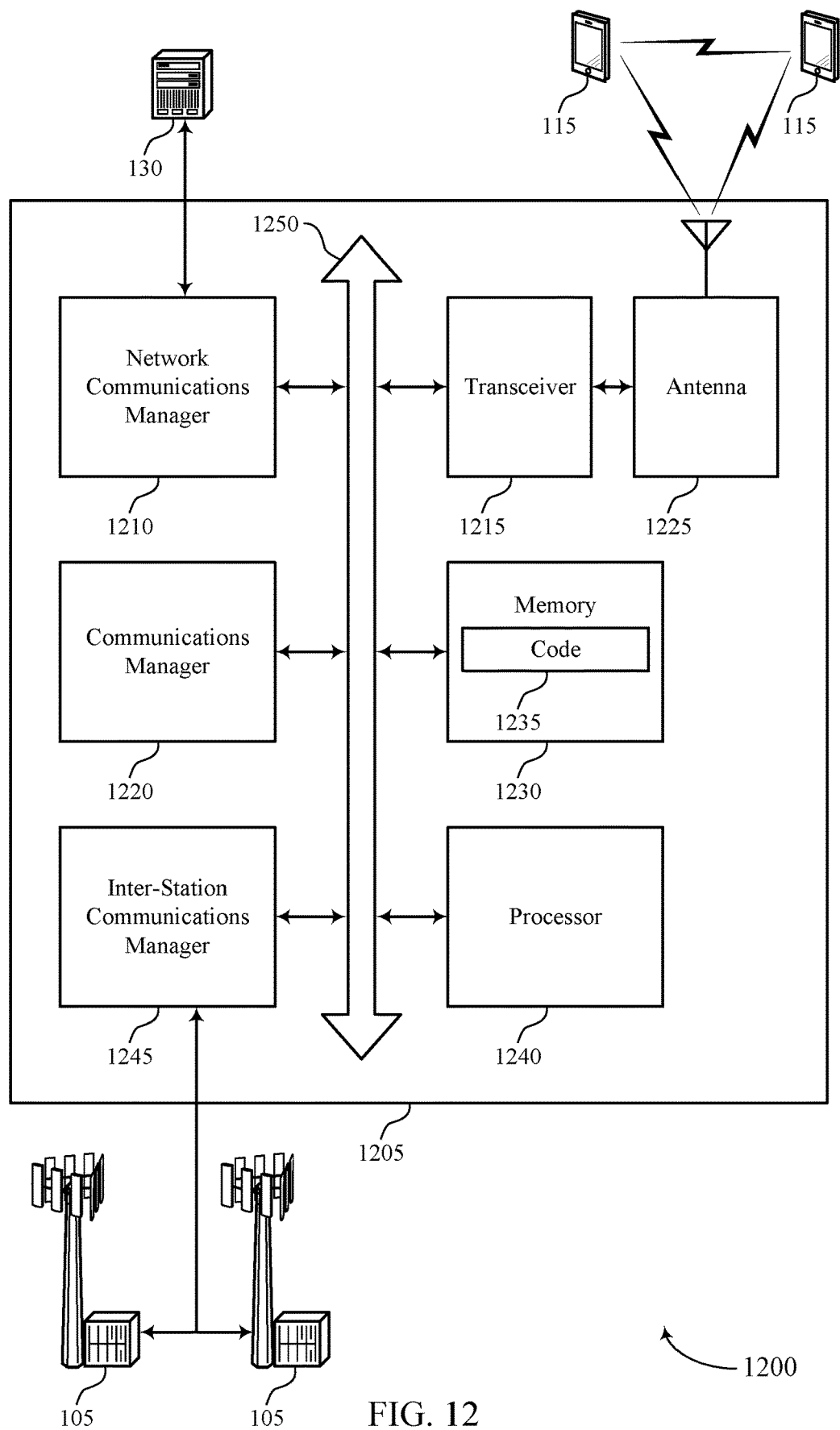
FIG. 12 shows a diagram of a system including a device that TDD pattern detection for repeaters in accordance with aspects of the present disclosure.

FIG. 12 shows a diagram of a system 1200 including a device 1205 that supports TDD pattern detection for repeaters in accordance with aspects of the present disclosure. The device 1205 may be an example of or include the components of a device 905, a device 1005, or a repeater as described herein. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting TDD pattern detection for repeaters). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at a repeater in accordance with examples as disclosed herein. For example, the communications manager 1220 may be configured as or otherwise support a means for transmitting, to a network control node, a first indication of a capability of the repeater to detect a TDD pattern of a channel that communicates information between two nodes using the repeater. The communications manager 1220 may be configured as or otherwise support a means for receiving a second indication of the TDD pattern of the channel based on transmitting the capability of the repeater. The communications manager 1220 may be configured as or otherwise support a means for adjusting one or more radio frequency components of the repeater based on the second indication of the TDD pattern.

By including or configuring the communications manager 1220 in accordance with examples as described herein, the device 1205 may support techniques for TDD pattern detection for repeaters, which may increase coverage and reduce signaling overhead. Further, in some examples, the repeater capability to detect TDD patterns as described herein may support a higher amplification gain at the repeater, which may improve the overall quality of communications between wireless nodes, thereby improving latency and reliability for an improved user experience.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of TDD pattern detection for repeaters as described herein, or the processor 1240 and the memory 1230 may be otherwise configured to perform or support such operations.

Figure 13:
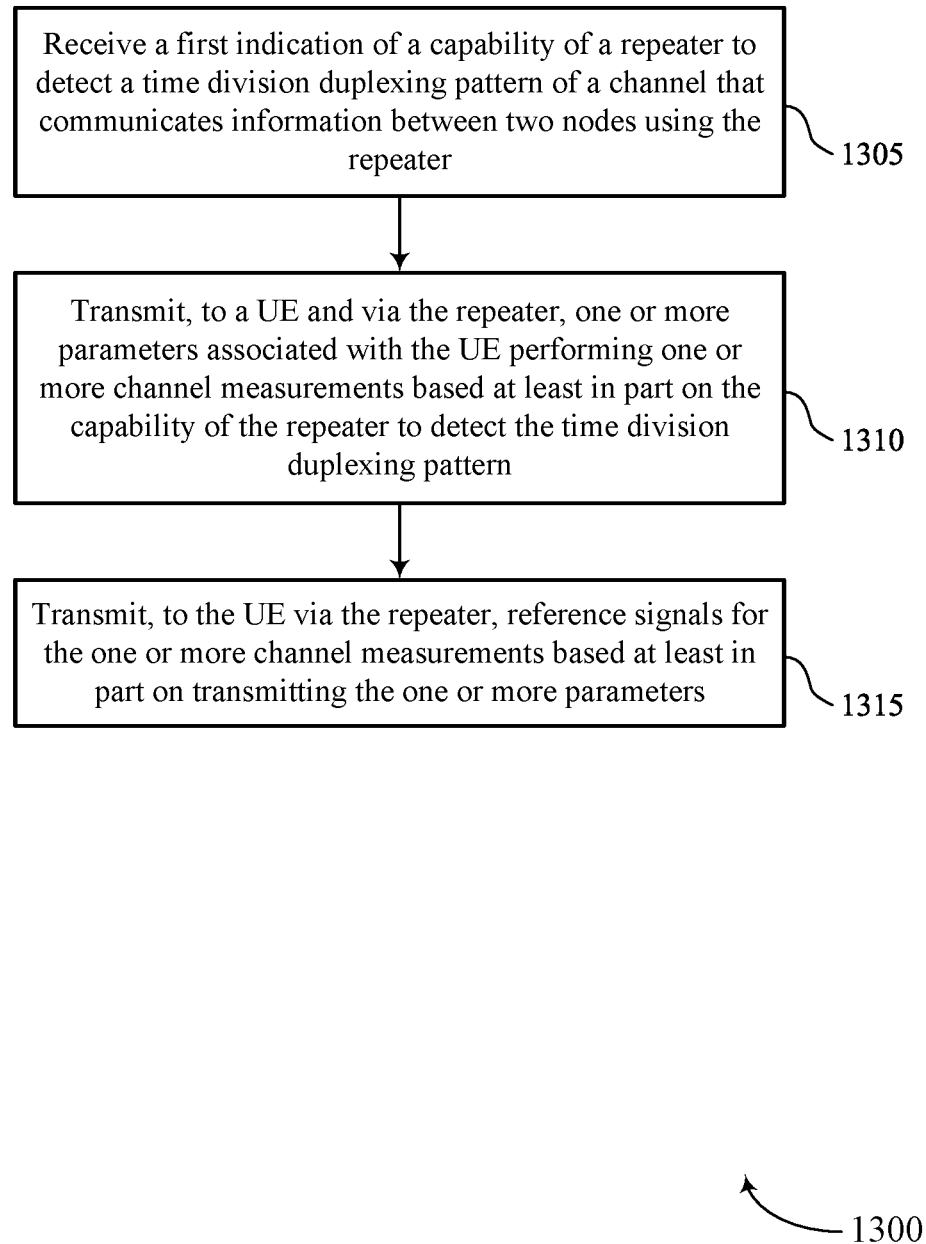
FIGS. 13 through 18 show flowcharts illustrating methods that support TDD pattern detection for repeaters in accordance with aspects of the present disclosure.

FIG. 13 shows a flowchart illustrating a method 1300 that supports TDD pattern detection for repeaters in accordance with aspects of the present disclosure. The operations of the method 1300 may be implemented by a network control node or its components as described herein. For example, the operations of the method 1300 may be performed by a network control node as described with reference to FIGS. 1 through 8. In some examples, a network control node may execute a set of instructions to control the functional elements of the network control node to perform the described functions. Additionally or alternatively, the network control node may perform aspects of the described functions using special-purpose hardware.

At 1305, the method may include receiving a first indication of a capability of a repeater to detect a TDD pattern of a channel that communicates information between two nodes using the repeater. The operations of 1305 may be performed in accordance with examples as disclosed herein. In some examples, aspects of the operations of 1305 may be performed by a capability reception component 725 as described with reference to FIG. 7.

At 1310, the method may include transmitting, to a UE and via the repeater, one or more parameters associated with the UE performing one or more channel measurements based on the capability of the repeater to detect the TDD pattern. The operations of 1310 may be performed in accordance with examples as disclosed herein. In some examples, aspects of the operations of 1310 may be performed by a parameter transmission component 730 as described with reference to FIG. 7.

At 1315, the method may include transmitting, to the UE via the repeater, reference signals for the one or more channel measurements based on transmitting the one or more parameters. The operations of 1315 may be performed in accordance with examples as disclosed herein. In some examples, aspects of the operations of 1315 may be performed by a reference signal transmission component 735 as described with reference to FIG. 7.

Figure 14:
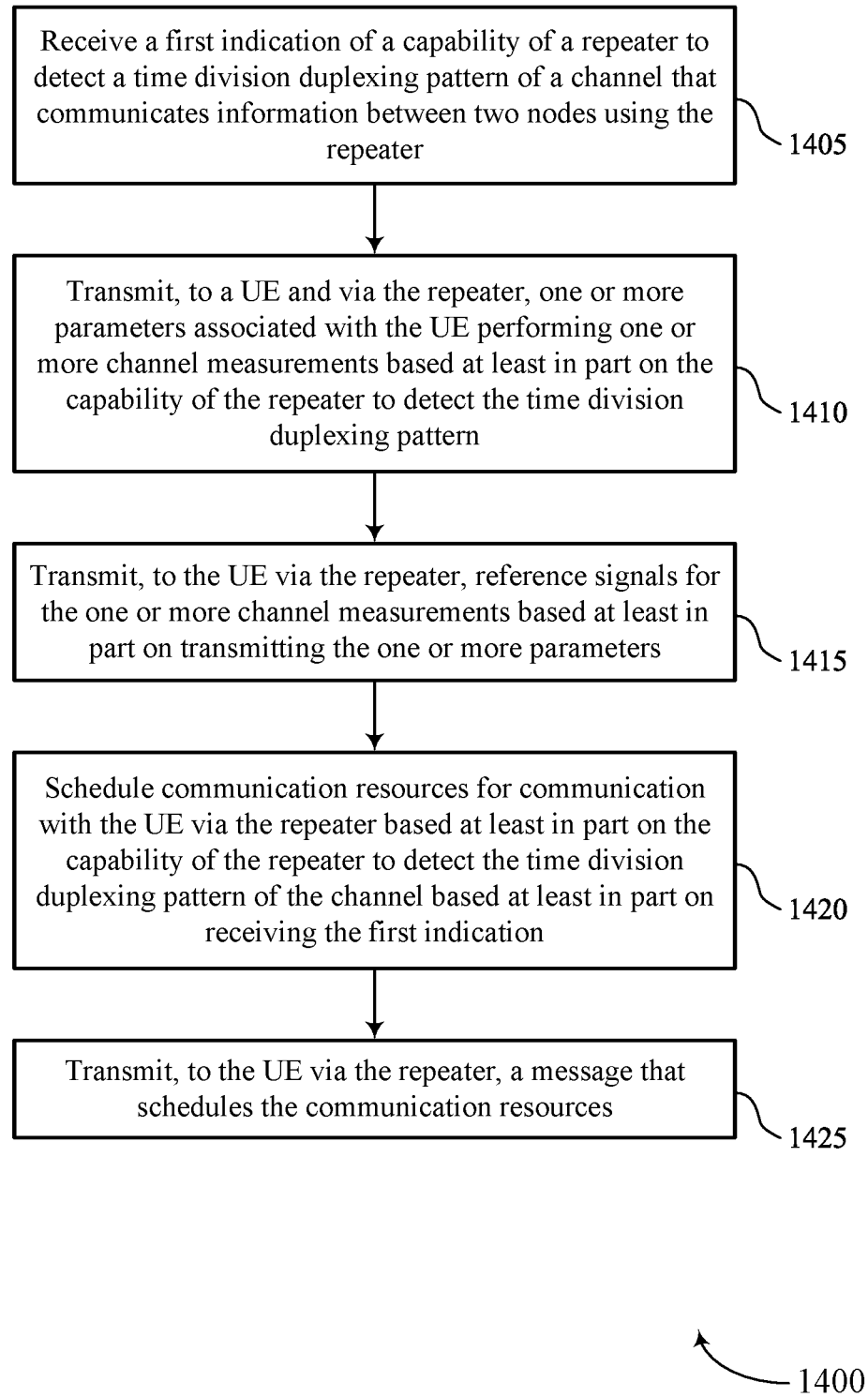

FIG. 14 shows a flowchart illustrating a method 1400 that supports TDD pattern detection for repeaters in accordance with aspects of the present disclosure. The operations of the method 1400 may be implemented by a network control node or its components as described herein. For example, the operations of the method 1400 may be performed by a network control node as described with reference to FIGS. 1 through 8. In some examples, a network control node may execute a set of instructions to control the functional elements of the network control node to perform the described functions. Additionally or alternatively, the network control node may perform aspects of the described functions using special-purpose hardware.

At 1405, the method may include receiving a first indication of a capability of a repeater to detect a TDD pattern of a channel that communicates information between two nodes using the repeater. The operations of 1405 may be performed in accordance with examples as disclosed herein. In some examples, aspects of the operations of 1405 may be performed by a capability reception component 725 as described with reference to FIG. 7.

At 1410, the method may include transmitting, to a UE and via the repeater, one or more parameters associated with the UE performing one or more channel measurements based on the capability of the repeater to detect the TDD pattern. The operations of 1410 may be performed in accordance with examples as disclosed herein. In some examples, aspects of the operations of 1410 may be performed by a parameter transmission component 730 as described with reference to FIG. 7.

At 1415, the method may include transmitting, to the UE via the repeater, reference signals for the one or more channel measurements based on transmitting the one or more parameters. The operations of 1415 may be performed in accordance with examples as disclosed herein. In some examples, aspects of the operations of 1415 may be performed by a reference signal transmission component 735 as described with reference to FIG. 7.

At 1420, the method may include scheduling communication resources for communication with the UE via the repeater based on the capability of the repeater to detect the TDD pattern of the channel based on receiving the first indication. The operations of 1420 may be performed in accordance with examples as disclosed herein. In some examples, aspects of the operations of 1420 may be performed by a communication resource scheduling component 740 as described with reference to FIG. 7.

At 1425, the method may include transmitting, to the UE via the repeater, a message that schedules the communication resources. The operations of 1425 may be performed in accordance with examples as disclosed herein. In some examples, aspects of the operations of 1425 may be performed by a communication resource scheduling component 740 as described with reference to FIG. 7.

Figure 15:
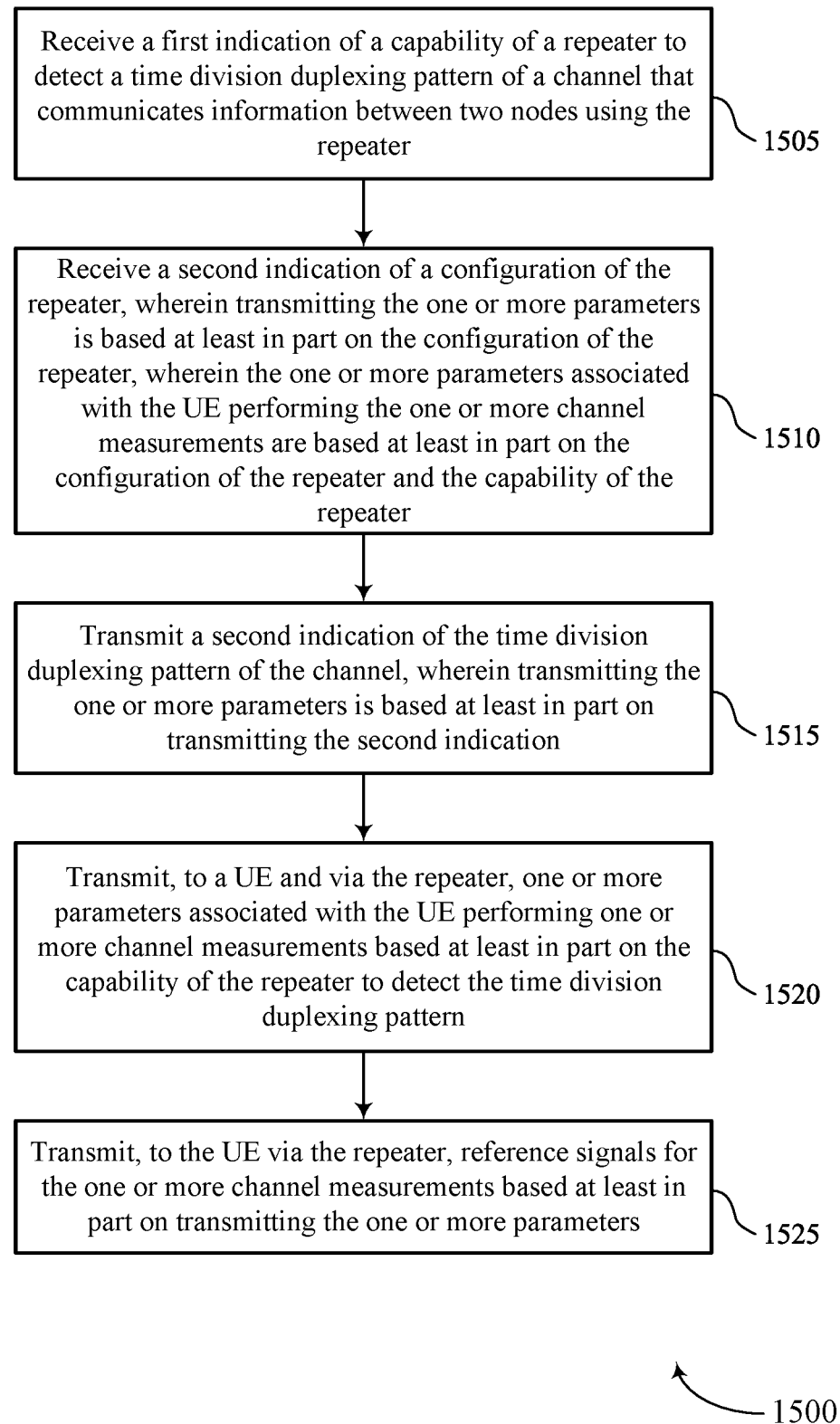

FIG. 15 shows a flowchart illustrating a method 1500 that supports TDD pattern detection for repeaters in accordance with aspects of the present disclosure. The operations of the method 1500 may be implemented by a network control node or its components as described herein. For example, the operations of the method 1500 may be performed by a network control node as described with reference to FIGS. 1 through 8. In some examples, a network control node may execute a set of instructions to control the functional elements of the network control node to perform the described functions. Additionally or alternatively, the network control node may perform aspects of the described functions using special-purpose hardware.

At 1505, the method may include receiving a first indication of a capability of a repeater to detect a TDD pattern of a channel that communicates information between two nodes using the repeater. The operations of 1505 may be performed in accordance with examples as disclosed herein. In some examples, aspects of the operations of 1505 may be performed by a capability reception component 725 as described with reference to FIG. 7.

At 1510, the method may include receiving a second indication of a configuration of the repeater, where transmitting the one or more parameters is based on the configuration of the repeater, where the one or more parameters associated with the UE performing the one or more channel measurements are based on the configuration of the repeater and the capability of the repeater. The operations of 1510 may be performed in accordance with examples as disclosed herein. In some examples, aspects of the operations of 1510 may be performed by a configuration reception component 745 as described with reference to FIG. 7.

At 1515, the method may include transmitting a second indication of the TDD pattern of the channel, where transmitting the one or more parameters is based on transmitting the second indication. The operations of 1515 may be performed in accordance with examples as disclosed herein. In some examples, aspects of the operations of 1515 may be performed by a TDD pattern transmission component 750 as described with reference to FIG. 7.

At 1520, the method may include transmitting, to a UE and via the repeater, one or more parameters associated with the UE performing one or more channel measurements based on the capability of the repeater to detect the TDD pattern. The operations of 1520 may be performed in accordance with examples as disclosed herein. In some examples, aspects of the operations of 1520 may be performed by a parameter transmission component 730 as described with reference to FIG. 7.

At 1525, the method may include transmitting, to the UE via the repeater, reference signals for the one or more channel measurements based on transmitting the one or more parameters. The operations of 1525 may be performed in accordance with examples as disclosed herein. In some examples, aspects of the operations of 1525 may be performed by a reference signal transmission component 735 as described with reference to FIG. 7.

Figure 16:
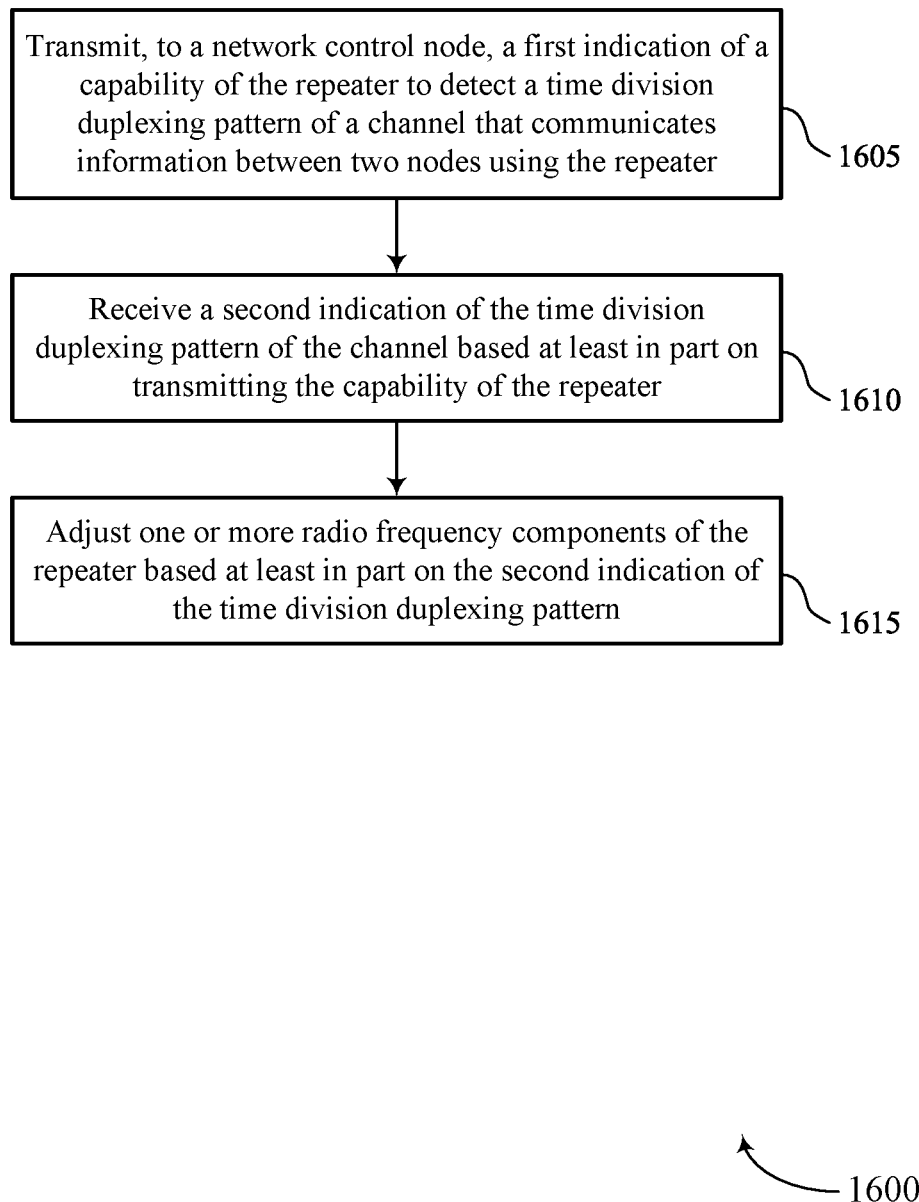

FIG. 16 shows a flowchart illustrating a method 1600 that supports TDD pattern detection for repeaters in accordance with aspects of the present disclosure. The operations of the method 1600 may be implemented by a repeater or its components as described herein. For example, the operations of the method 1600 may be performed by a repeater as described with reference to FIGS. 1 through 4 and 9 through 12. In some examples, a repeater may execute a set of instructions to control the functional elements of the repeater to perform the described functions. Additionally or alternatively, the repeater may perform aspects of the described functions using special-purpose hardware.

At 1605, the method may include transmitting, to a network control node, a first indication of a capability of the repeater to detect a TDD pattern of a channel that communicates information between two nodes using the repeater. The operations of 1605 may be performed in accordance with examples as disclosed herein. In some examples, aspects of the operations of 1605 may be performed by a capability transmission component 1125 as described with reference to FIG. 11.

At 1610, the method may include receiving a second indication of the TDD pattern of the channel based on transmitting the capability of the repeater. The operations of 1610 may be performed in accordance with examples as disclosed herein. In some examples, aspects of the operations of 1610 may be performed by a TDD pattern reception component 1130 as described with reference to FIG. 11.

At 1615, the method may include adjusting one or more radio frequency components of the repeater based on the second indication of the TDD pattern. The operations of 1615 may be performed in accordance with examples as disclosed herein. In some examples, aspects of the operations of 1615 may be performed by a radio frequency adjusting component 1135 as described with reference to FIG. 11.

Figure 17:
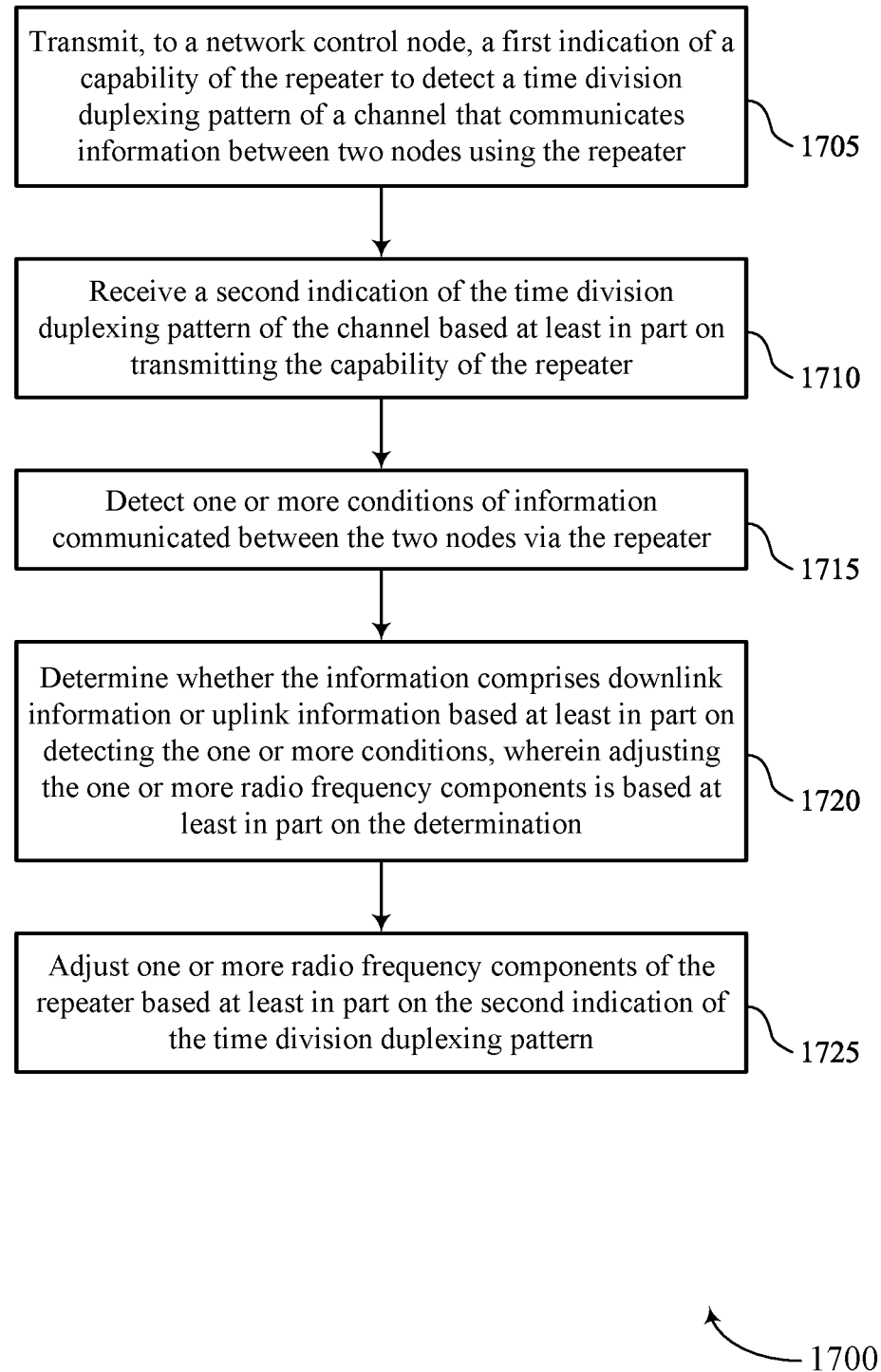

FIG. 17 shows a flowchart illustrating a method 1700 that supports TDD pattern detection for repeaters in accordance with aspects of the present disclosure. The operations of the method 1700 may be implemented by a repeater or its components as described herein. For example, the operations of the method 1700 may be performed by a repeater as described with reference to FIGS. 1 through 4 and 9 through 12. In some examples, a repeater may execute a set of instructions to control the functional elements of the repeater to perform the described functions. Additionally or alternatively, the repeater may perform aspects of the described functions using special-purpose hardware.

At 1705, the method may include transmitting, to a network control node, a first indication of a capability of the repeater to detect a TDD pattern of a channel that communicates information between two nodes using the repeater. The operations of 1705 may be performed in accordance with examples as disclosed herein. In some examples, aspects of the operations of 1705 may be performed by a capability transmission component 1125 as described with reference to FIG. 11.

At 1710, the method may include receiving a second indication of the TDD pattern of the channel based on transmitting the capability of the repeater. The operations of 1710 may be performed in accordance with examples as disclosed herein. In some examples, aspects of the operations of 1710 may be performed by a TDD pattern reception component 1130 as described with reference to FIG. 11.

At 1715, the method may include detecting one or more conditions of information communicated between the two nodes via the repeater. The operations of 1715 may be performed in accordance with examples as disclosed herein. In some examples, aspects of the operations of 1715 may be performed by an information detection component 1140 as described with reference to FIG. 11.

At 1720, the method may include determining whether the information includes downlink information or uplink information based on detecting the one or more conditions, where adjusting the one or more radio frequency components is based on the determination. The operations of 1720 may be performed in accordance with examples as disclosed herein. In some examples, aspects of the operations of 1720 may be performed by an information detection component 1140 as described with reference to FIG. 11.

At 1725, the method may include adjusting one or more radio frequency components of the repeater based on the second indication of the TDD pattern. The operations of 1725 may be performed in accordance with examples as disclosed herein. In some examples, aspects of the operations of 1725 may be performed by a radio frequency adjusting component 1135 as described with reference to FIG. 11.

Figure 18:
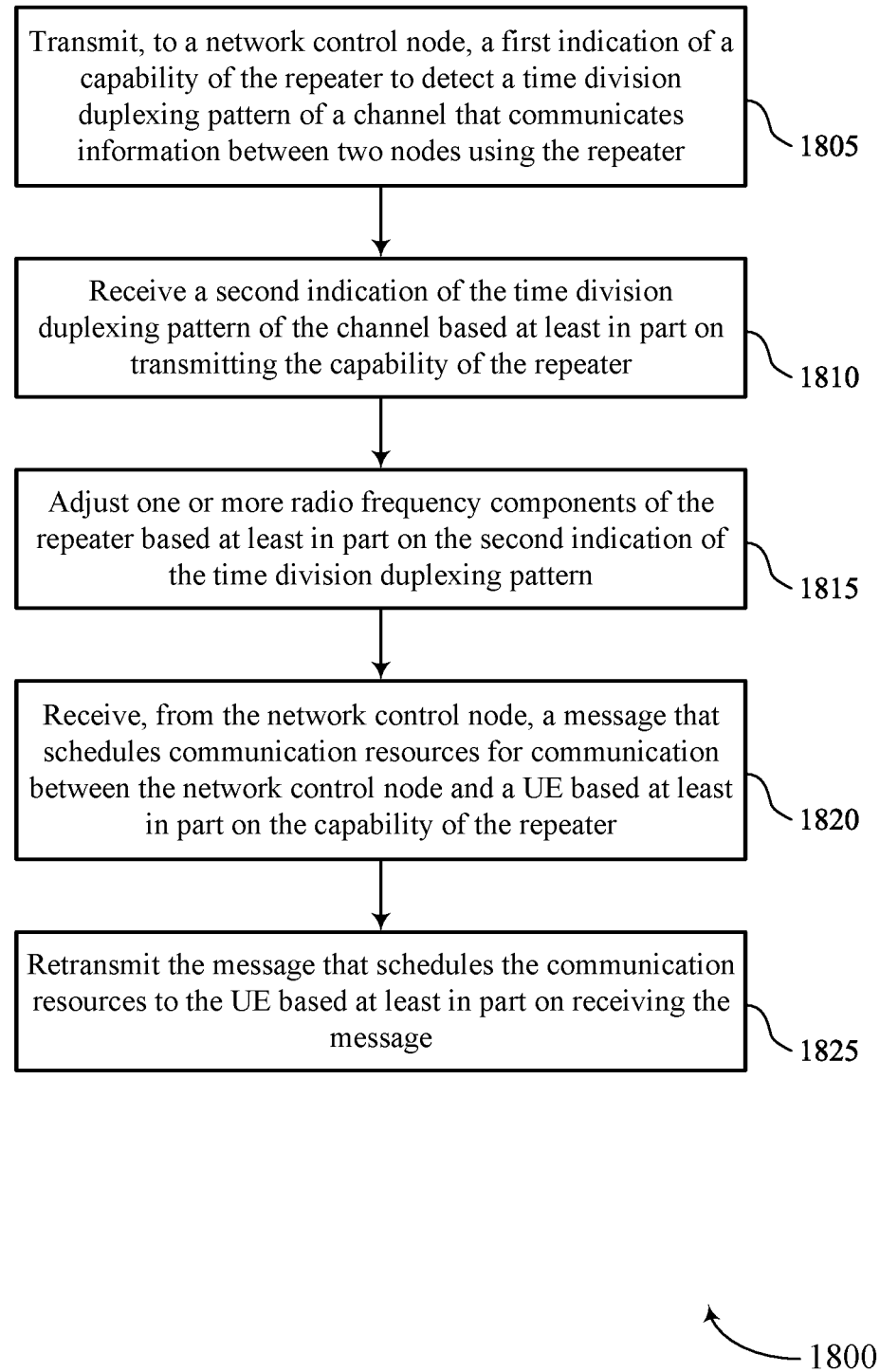

FIG. 18 shows a flowchart illustrating a method 1800 that supports TDD pattern detection for repeaters in accordance with aspects of the present disclosure. The operations of the method 1800 may be implemented by a repeater or its components as described herein. For example, the operations of the method 1800 may be performed by a repeater as described with reference to FIGS. 1 through 4 and 9 through 12. In some examples, a repeater may execute a set of instructions to control the functional elements of the repeater to perform the described functions. Additionally or alternatively, the repeater may perform aspects of the described functions using special-purpose hardware.

At 1805, the method may include transmitting, to a network control node, a first indication of a capability of the repeater to detect a TDD pattern of a channel that communicates information between two nodes using the repeater. The operations of 1805 may be performed in accordance with examples as disclosed herein. In some examples, aspects of the operations of 1805 may be performed by a capability transmission component 1125 as described with reference to FIG. 11.

At 1810, the method may include receiving a second indication of the TDD pattern of the channel based on transmitting the capability of the repeater. The operations of 1810 may be performed in accordance with examples as disclosed herein. In some examples, aspects of the operations of 1810 may be performed by a TDD pattern reception component 1130 as described with reference to FIG. 11.

At 1815, the method may include adjusting one or more radio frequency components of the repeater based on the second indication of the TDD pattern. The operations of 1815 may be performed in accordance with examples as disclosed herein. In some examples, aspects of the operations of 1815 may be performed by a radio frequency adjusting component 1135 as described with reference to FIG. 11.

At 1820, the method may include receiving, from the network control node, a message that schedules communication resources for communication between the network control node and a UE based on the capability of the repeater. The operations of 1820 may be performed in accordance with examples as disclosed herein. In some examples, aspects of the operations of 1820 may be performed by a communication resource component 1145 as described with reference to FIG. 11.

At 1825, the method may include retransmitting the message that schedules the communication resources to the UE based on receiving the message. The operations of 1825 may be performed in accordance with examples as disclosed herein. In some examples, aspects of the operations of 1825 may be performed by a communication resource component 1145 as described with reference to FIG. 11.

The following provides an overview of aspects of the present disclosure:

Aspect 1: A method for wireless communication at a network control node, comprising: receiving a first indication of a capability of a repeater to detect a TDD pattern of a channel that communicates information between two nodes using the repeater; transmitting, to a UE and via the repeater, one or more parameters associated with the UE performing one or more channel measurements based at least in part on the capability of the repeater to detect the TDD pattern; and transmitting, to the UE via the repeater, reference signals for the one or more channel measurements based at least in part on transmitting the one or more parameters.

Aspect 2: The method of aspect 1, further comprising: scheduling communication resources for communication with the UE via the repeater based at least in part on the capability of the repeater to detect the TDD pattern of the channel based at least in part on receiving the first indication; and transmitting, to the UE via the repeater, a message that schedules the communication resources.

Aspect 3: The method of any of aspects 1 through 2, further comprising: receiving a second indication of a configuration of the repeater, wherein transmitting the one or more parameters is based at least in part on the configuration of the repeater, wherein the one or more parameters associated with the UE performing the one or more channel measurements are based at least in part on the configuration of the repeater and the capability of the repeater.

Aspect 4: The method of any of aspects 1 through 3, further comprising: transmitting a second indication of the TDD pattern of the channel, wherein transmitting the one or more parameters is based at least in part on transmitting the second indication.

Aspect 5: The method of aspect 4, wherein the second indication comprises an information element communicated in an SIB, the information element comprising a common TDD configuration associated with a cell of a wireless network.

Aspect 6: The method of any of aspects 4 through 5, wherein the second indication comprises an information element communicated in an RRC reconfiguration message, the information element comprising a dedicated TDD configuration that is specific to the UE.

Aspect 7: The method of any of aspects 4 through 6, wherein the second indication comprises an SFI communicated in DCI, a specific slot format in the SFI associated with the UE in a serving cell.

Aspect 8: The method of any of aspects 4 through 7, wherein transmitting the one or more parameters associated with the UE performing the one or more channel measurements further comprises: transmitting, based at least in part on the second indication, a third indication to perform a first set of channel measurements on a first set of resources indicated by the TDD pattern as uplink or downlink and a fourth indication to perform a second set of channel measurements on a second set of resources indicated by the TDD pattern as flexibly configurable as either uplink or downlink.

Aspect 9: The method of any of aspects 1 through 8, further comprising: receiving, from the repeater, a feedback message indicating one or more conditions associated with the repeater; and transmitting, to the UE and via the repeater, the one or more parameters associated with the UE performing the one or more channel measurements based at least in part on receiving the feedback message.

Aspect 10: The method of any of aspects 1 through 9, wherein the one or more parameters comprises a power control parameter, a resource configuration, or a combination thereof.

Aspect 11: The method of any of aspects 1 through 10, wherein the first indication comprises a first capability that the repeater is capable of decoding system block information, a second capability that the repeater is capable of decoding an RRC reconfiguration message, a third capability that the repeater is capable of decoding DCI, a fourth capability that the repeater is capable of detecting whether a communication resource is used to communicate uplink information or downlink information, or a combination thereof.

Aspect 12: The method of any of aspects 1 through 11, wherein the repeater is a traditional repeater configured to receive and amplify signals independent of control information about the TDD pattern of the channel, an autonomous repeater configured to identify information about the TDD pattern of the channel based at least in part on channel conditions at the repeater, or a network-controlled repeater configured to receive the control information about the TDD pattern of the channel.

Aspect 13: The method of any of aspects 1 through 12, further comprising: transmitting a second indication of communication parameters for communications between the UE and the network control node based at least in part on the capability of the repeater, the communication parameters comprising an MCS, a rank, a quantity of beams, or a combination thereof.

Aspect 14: The method of any of aspects 1 through 13, further comprising: transmitting, to the repeater, a power configuration associated with the channel, the TDD pattern associated with the channel, or a combination thereof based at least in part on the capability of the repeater.

Aspect 15: The method of any of aspects 1 through 14, wherein the network control node comprises a base station, a UE, or a combination thereof.

Aspect 16: A method for wireless communication at a repeater, comprising: transmitting, to a network control node, a first indication of a capability of the repeater to detect a TDD pattern of a channel that communicates information between two nodes using the repeater; receiving a second indication of the TDD pattern of the channel based at least in part on transmitting the capability of the repeater; and adjusting one or more radio frequency components of the repeater based at least in part on the second indication of the TDD pattern.

Aspect 17: The method of aspect 16, further comprising: detecting one or more conditions of information communicated between the two nodes via the repeater; and determining whether the information comprises downlink information or uplink information based at least in part on detecting the one or more conditions, wherein adjusting the one or more radio frequency components is based at least in part on the determination.

Aspect 18: The method of any of aspects 16 through 17, further comprising: receiving, from the network control node, a message that schedules communication resources for communication between the network control node and a UE based at least in part on the capability of the repeater; and retransmitting the message that schedules the communication resources to the UE based at least in part on receiving the message.

Aspect 19: The method of any of aspects 16 through 18, wherein the second indication comprises an information element communicated in an SIB, the information element comprising a common TDD configuration associated with a cell of a wireless network.

Aspect 20: The method of any of aspects 16 through 19, wherein the second indication comprises an information element communicated in an RRC reconfiguration message, the information element comprising a dedicated TDD configuration that is specific to the UE.

Aspect 21: The method of any of aspects 16 through 20, wherein the second indication comprises an SFI communicated in DCI, a specific slot format in the SFI associated with the UE in a serving cell.

Aspect 22: The method of any of aspects 16 through 21, further comprising: transmitting a third indication of a configuration of the repeater, wherein receiving the second indication is based at least in part on the configuration of the repeater.

Aspect 23: The method of any of aspects 16 through 22, wherein the first indication comprises a first capability that the repeater is capable of decoding system block information, a second capability that the repeater is capable of decoding an RRC reconfiguration message, a third capability that the repeater is capable of decoding DCI, a fourth capability that the repeater is capable of detecting whether a communication resource is used to communicate uplink information or downlink information, or a combination thereof.

Aspect 24: The method of any of aspects 16 through 23, wherein the repeater comprises a network-controlled repeater configured to receive control information about the TDD pattern of the channel.

Aspect 25: The method of any of aspects 16 through 24, further comprising: receiving a third indication of communication parameters for communications between the UE and the network control node based at least in part on the capability of the repeater, the communication parameters comprising an MCS, a rank, a quantity of beams, or a combination thereof.

Aspect 26: The method of any of aspects 16 through 25, further comprising: receiving, from the network control node, a power configuration associated with the channel, the TDD pattern associated with the channel, or a combination thereof based at least in part on the capability of the repeater to detect the TDD pattern.

Aspect 27: An apparatus for wireless communication at a network control node, comprising a processor; memory coupled with the processor; and instructions stored in the memory and executable by the processor to cause the apparatus to perform a method of any of aspects 1 through 15.

Aspect 28: An apparatus for wireless communication at a network control node, comprising at least one means for performing a method of any of aspects 1 through 15.

Aspect 29: A non-transitory computer-readable medium storing code for wireless communication at a network control node, the code comprising instructions executable by a processor to perform a method of any of aspects 1 through 15.

Aspect 30: An apparatus for wireless communication at a repeater, comprising a processor; memory coupled with the processor; and instructions stored in the memory and executable by the processor to cause the apparatus to perform a method of any of aspects 16 through 26.

Aspect 31: An apparatus for wireless communication at a repeater, comprising at least one means for performing a method of any of aspects 16 through 26.

Aspect 32: A non-transitory computer-readable medium storing code for wireless communication at a repeater, the code comprising instructions executable by a processor to perform a method of any of aspects 16 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a network control node, comprising:
   receiving a first indication of a capability of a repeater to detect a time division duplexing pattern of a channel that communicates information between two nodes using the repeater, wherein the time division duplexing pattern indicates a first set of resources of the channel as uplink or downlink and a second set of resources of the channel as flexibly configurable as either uplink or downlink;
   transmitting a second indication of the time division duplexing pattern of the channel;
   transmitting, based at least in part on the second indication, a third indication to perform a first set of channel measurements on the first set of resources and a fourth indication to perform a second set of channel measurements on the second set of resources;
   transmitting, to a user equipment (UE) and via the repeater, one or more parameters associated with the UE performing one or more channel measurements based at least in part on the second indication and the capability of the repeater to detect the time division duplexing pattern; and
   transmitting, to the UE via the repeater, reference signals for the one or more channel measurements based at least in part on transmitting the one or more parameters.

2. The method of claim 1, further comprising:
   scheduling communication resources for communication with the UE via the repeater based at least in part on the capability of the repeater to detect the time division duplexing pattern of the channel and receiving the first indication; and
   transmitting, to the UE via the repeater, a message that schedules the communication resources.

3. The method of claim 1, further comprising:
   receiving a second indication of a configuration of the repeater, wherein transmitting the one or more parameters is based at least in part on the configuration of the repeater, wherein the one or more parameters associated with the UE performing the one or more channel measurements are based at least in part on the configuration of the repeater and the capability of the repeater.

4. The method of claim 1, wherein the second indication comprises an information element communicated in a system information block, the information element comprising a common time division duplexing configuration associated with a cell of a wireless network.

5. The method of claim 1, wherein the second indication comprises an information element communicated in a radio resource control reconfiguration message, the information element comprising a dedicated time division duplexing configuration that is specific to the UE.

6. The method of claim 1, wherein the second indication comprises a slot format indicator communicated in downlink control information, a specific slot format in the slot format indicator associated with the UE in a serving cell.

7. The method of claim 1, further comprising:
   receiving, from the repeater, a feedback message indicating one or more conditions associated with the repeater; and
   transmitting, to the UE and via the repeater, the one or more parameters associated with the UE performing the one or more channel measurements based at least in part on receiving the feedback message.

8. The method of claim 1, wherein the one or more parameters comprises a power control parameter, a resource configuration, or a combination thereof.

9. The method of claim 1, wherein the first indication comprises a first capability that the repeater is capable of decoding system block information, a second capability that the repeater is capable of decoding a radio resource control reconfiguration message, a third capability that the repeater is capable of decoding downlink control information, a fourth capability that the repeater is capable of detecting whether a communication resource is used to communicate uplink information or downlink information, or a combination thereof.

10. The method of claim 1, wherein the repeater is a traditional repeater configured to receive and amplify signals independent of control information about the time division duplexing pattern of the channel, an autonomous repeater configured to identify information about the time division duplexing pattern of the channel based at least in part on channel conditions at the repeater, or a network-controlled repeater configured to receive the control information about the time division duplexing pattern of the channel.

11. The method of claim 1, further comprising:
    transmitting a second indication of communication parameters for communications between the UE and the network control node based at least in part on the capability of the repeater, the communication parameters comprising a modulation and coding scheme, a rank, a quantity of beams, or a combination thereof.

12. The method of claim 1, further comprising:
    transmitting, to the repeater, a power configuration associated with the channel, the time division duplexing pattern associated with the channel, or a combination thereof based at least in part on the capability of the repeater.

13. The method of claim 1, wherein the network control node comprises a base station, a UE, or a combination thereof.

14. A method for wireless communication at a repeater, comprising:
    transmitting, to a network control node, a first indication of a capability of the repeater to detect a time division duplexing pattern of a channel that communicates information between two nodes using the repeater, wherein the time division duplexing pattern indicates a first set of resources of the channel as uplink or downlink and a second set of resources of the channel as flexibly configurable as either uplink or downlink;
    receiving a second indication of the time division duplexing pattern of the channel based at least in part on transmitting the capability of the repeater;
    receiving, based at least in part on the second indication, a third indication to perform a first set of channel measurements on the first set of resources and a fourth indication to perform a second set of channel measurements on the second set of resources; and
    adjusting one or more radio frequency components of the repeater based at least in part on the second indication of the time division duplexing pattern.

15. The method of claim 14, further comprising:
    detecting one or more conditions of information communicated between the two nodes via the repeater; and
    determining whether the information comprises downlink information or uplink information based at least in part on detecting the one or more conditions, wherein adjusting the one or more radio frequency components is based at least in part on the determination.

16. The method of claim 14, further comprising:
receiving, from the network control node, a message that schedules communication resources for communication between the network control node and a user equipment (UE) based at least in part on the capability of the repeater; and
retransmitting the message that schedules the communication resources to the UE based at least in part on receiving the message.

17. The method of claim 14, wherein the second indication comprises an information element communicated in a system information block, the information element comprising a common time division duplexing configuration associated with a cell of a wireless network.

18. The method of claim 14, wherein the second indication comprises an information element communicated in a radio resource control reconfiguration message, the information element comprising a dedicated time division duplexing configuration that is specific to a UE.

19. The method of claim 14, wherein the second indication comprises a slot format indicator communicated in downlink control information, a specific slot format in the slot format indicator associated with a UE in a serving cell.

20. The method of claim 14, further comprising:
transmitting a third indication of a configuration of the repeater, wherein receiving the second indication is based at least in part on the configuration of the repeater.

21. The method of claim 14, wherein the first indication comprises a first capability that the repeater is capable of decoding system block information, a second capability that the repeater is capable of decoding a radio resource control reconfiguration message, a third capability that the repeater is capable of decoding downlink control information, a fourth capability that the repeater is capable of detecting whether a communication resource is used to communicate uplink information or downlink information, or a combination thereof.

22. The method of claim 14, wherein the repeater comprises a network-controlled repeater configured to receive control information about the time division duplexing pattern of the channel.

23. The method of claim 14, further comprising:
receiving a third indication of communication parameters for communications between a UE and the network control node based at least in part on the capability of the repeater, the communication parameters comprising a modulation and coding scheme, a rank, a quantity of beams, or a combination thereof.

24. The method of claim 14, further comprising:
receiving, from the network control node, a power configuration associated with the channel, the time division duplexing pattern associated with the channel, or a combination thereof based at least in part on the capability of the repeater to detect the time division duplexing pattern.

25. An apparatus for wireless communication at a network control node, comprising:
a processor;
memory coupled with the processor; and
instructions stored in the memory and executable by the processor to cause the apparatus to:
receive a first indication of a capability of a repeater to detect a time division duplexing pattern of a channel that communicates information between two nodes using the repeater, wherein the time division duplexing pattern indicates a first set of resources of the channel as uplink or downlink and a second set of resources of the channel as flexibly configurable as either uplink or downlink;
transmit a second indication of the time division duplexing pattern of the channel;
transmit, based at least in part on the second indication, a third indication to perform a first set of channel measurements on the first set of resources and a fourth indication to perform a second set of channel measurements on the second set of resources;
transmit, to a user equipment (UE) and via the repeater, one or more parameters associated with the UE performing one or more channel measurements based at least in part on the second indication and the capability of the repeater to detect the time division duplexing pattern; and
transmit, to the UE via the repeater, reference signals for the one or more channel measurements based at least in part on transmitting the one or more parameters.

26. The apparatus of claim 25, wherein the instructions are further executable by the processor to cause the apparatus to:
schedule communication resources for communication with the UE via the repeater based at least in part on the capability of the repeater to detect the time division duplexing pattern of the channel based at least in part on receiving the first indication; and
transmit, to the UE via the repeater, a message that schedules the communication resources.

27. An apparatus for wireless communication at a repeater, comprising:
a processor;
memory coupled with the processor; and
instructions stored in the memory and executable by the processor to cause the apparatus to:
transmit, to a network control node, a first indication of a capability of the repeater to detect a time division duplexing pattern of a channel that communicates information between two nodes using the repeater, wherein the time division duplexing pattern indicates a first set of resources of the channel as uplink or downlink and a second set of resources of the channel as flexibly configurable as either uplink or downlink;
receive a second indication of the time division duplexing pattern of the channel based at least in part on transmitting the capability of the repeater;
receive, based at least in part on the second indication, a third indication to perform a first set of channel measurements on the first set of resources and a fourth indication to perform a second set of channel measurements on the second set of resources; and
adjust one or more radio frequency components of the repeater based at least in part on the second indication of the time division duplexing pattern.

28. The apparatus of claim 27, wherein the instructions are further executable by the processor to cause the apparatus to:

detect one or more conditions of information communicated between the two nodes via the repeater; and determine whether the information comprises downlink information or uplink information based at least in part on detecting the one or more conditions, wherein adjusting the one or more radio frequency components is based at least in part on the determination.

\* \* \* \* \*